(12) United States Patent
Hiraoka et al.

(10) Patent No.: US 12,287,052 B2
(45) Date of Patent: Apr. 29, 2025

(54) CONDUIT SUPPORT DEVICE

(71) Applicant: JUNKOSHA INC., Ibaraki (JP)

(72) Inventors: Daiki Hiraoka, Ibaraki (JP); Hiroshi Takeuchi, Ibaraki (JP); Yasuhiro Misu, Ibaraki (JP)

(73) Assignee: JUNKOSHA INC., Ibaraki (JP)

( * ) Notice: Subject to any disclaimer, the term of this patent is extended or adjusted under 35 U.S.C. 154(b) by 0 days.

(21) Appl. No.: 18/133,708

(22) Filed: Apr. 12, 2023

(65) Prior Publication Data
US 2023/0250896 A1 Aug. 10, 2023

Related U.S. Application Data

(63) Continuation of application No. 17/418,628, filed as application No. PCT/JP2019/051296 on Dec. 26, 2019, now Pat. No. 11,655,916.

(51) Int. Cl.
*F16L 3/015* (2006.01)
*F16L 3/23* (2006.01)
*F16L 3/26* (2006.01)

(52) U.S. Cl.
CPC ............ *F16L 3/015* (2013.01); *F16L 3/23* (2013.01); *F16L 3/26* (2013.01)

(58) Field of Classification Search
CPC ............... F16L 3/015; F16L 3/23; F16L 3/26
See application file for complete search history.

(56) References Cited

U.S. PATENT DOCUMENTS

| | | | |
|---|---|---|---|
| 6,571,833 B1 * | 6/2003 | McLarty, III | H02G 9/06 112/155 |
| 6,803,400 B1 * | 10/2004 | Butterbach | D04H 1/64 524/270 |
| 10,083,777 B2 * | 9/2018 | Tetsuka | F16G 13/18 |
| 2004/0112625 A1 | 6/2004 | Sheikholeslami et al. | |
| 2007/0227117 A1 | 10/2007 | Iwami et al. | |

(Continued)

FOREIGN PATENT DOCUMENTS

| | | |
|---|---|---|
| CN | 101046236 A | 10/2007 |
| CN | 101141055 A | 3/2008 |

(Continued)

OTHER PUBLICATIONS

Superlube® 41160 synthetic grease sold on amazon dated May 27, 2017, https://www.amazon.com/Super-Lube-41160-Synthetic-Translucent/dp/B0083R1FME (Year: 2017).*

(Continued)

*Primary Examiner* — Eret C McNichols
*Assistant Examiner* — Ding Y Tan
(74) *Attorney, Agent, or Firm* — Paratus Law Group, PLLC

(57) ABSTRACT

The present invention provides a conduit support device having high reliability even under severe conditions. A conduit support including a conduit, a support member configured to extend along a longitudinal direction of the conduit, and integrally support the conduit, and be capable of being bent at an arbitrary position in the longitudinal direction, and an accommodation member within which the conduit and the support member are stored, wherein an intermediate member is arranged between the support member and the accommodation member is provided.

18 Claims, 8 Drawing Sheets

(56) References Cited

U.S. PATENT DOCUMENTS

| | | |
|---|---|---|
| 2008/0053057 A1 | 3/2008 | Ikeda et al. |
| 2008/0236131 A1 | 10/2008 | Komiya |
| 2010/0032531 A1 | 2/2010 | Getts |
| 2011/0121141 A1* | 5/2011 | Tatsuta .................. F16G 13/20 |
| | | 248/49 |
| 2011/0240805 A1 | 10/2011 | Komiya |
| 2012/0187271 A1 | 7/2012 | Komiya |
| 2012/0205498 A1 | 8/2012 | Komiya |
| 2012/0228437 A1 | 9/2012 | Tatsuta et al. |
| 2013/0075129 A1 | 3/2013 | Kaihotsu et al. |
| 2014/0042280 A1* | 2/2014 | Takeuchi .............. H02G 3/0475 |
| | | 248/49 |
| 2016/0049222 A1* | 2/2016 | Zhou ..................... H01B 3/302 |
| | | 174/117 F |
| 2016/0343471 A1* | 11/2016 | Ernst .................. H01B 13/0214 |
| 2019/0262985 A1* | 8/2019 | Yoshimura ........... B25J 19/0058 |

FOREIGN PATENT DOCUMENTS

| | | | |
|---|---|---|---|
| CN | 101275622 A | | 10/2008 |
| CN | 102082409 A | | 6/2011 |
| CN | 102235550 A | | 11/2011 |
| CN | 102611045 A | | 7/2012 |
| CN | 102705585 A | | 10/2012 |
| CN | 102918731 A | | 2/2013 |
| CN | 103016619 A | | 4/2013 |
| CN | 203659461 U | * | 6/2014 |
| CN | 205789184 U | | 12/2016 |
| JP | 2000-161447 A | | 6/2000 |
| JP | 2006507788 A | * | 3/2006 |
| JP | 2010-135210 A | | 6/2010 |
| JP | 2012-170186 A | | 9/2012 |
| JP | 2012170245 A | * | 9/2012 ........... H02G 11/006 |
| JP | 2012220685 A | * | 11/2012 |
| JP | 2013-076452 A | | 4/2013 |
| JP | 2013198224 A | * | 9/2013 |
| JP | 2017-022823 A | | 1/2017 |
| JP | 2017021903 A | * | 1/2017 |
| KR | 10-2017-0082102 A | | 7/2017 |
| TW | 201425193 A | * | 7/2014 |
| TW | M489403 U | * | 8/2014 |
| WO | WO 2016/175080 A1 | | 11/2016 |

OTHER PUBLICATIONS

Design World online article by by Patrick Curran dated Jul. 23, 2009 titled "Flat Cables Reduce Particulation in Cleanroom Environments" https://www.designworldonline.com/flat-cables-reduce-particulation-in-cleanroom-environments/ (Year: 2009).*

MachineDesign Biz bits online news announcement titled "Gore announces cable study results" dated Sep. 1, 2009 https://www.machinedesign.com/archive/article/21827744/biz-bits (Year: 2009).*

Mar. 17, 2020, International Search Report issued for related PCT application No. PCT/JP2019/051296.

Mar. 17, 2020, International Search Opinion issued for related PCT application No. PCT/JP2019/051296.

Mar. 22, 2022, Chinese Office Action issued for related CN Application No. 201980086338.4.

Jan. 17, 2024, Japanese Office Action issued for related JP Application No. 2020-562454.

May 20, 2024, Chinese Office Action issued for related CN Application No. 202211454073.9.

* cited by examiner

CONDUIT SUPPORT DEVICE

CROSS-REFERENCE TO RELATED APPLICATIONS

The present application is a continuation of U.S. patent application Ser. No. 17/418,628 filed on Jun. 25, 2021, which is a National Stage Patent Application of PCT International Patent Application No. PCT/JP2019/051296 filed on Dec. 26, 2019 under 35 U.S.C. § 371, which claims priority to Japanese Patent Application No. 2018-248207 filed on Dec. 28, 2018, which is hereby incorporated by reference in its entirety.

TECHNICAL FIELD

The present invention relates to a conduit support device which includes a conduit and a support member integrated with the conduit to support the conduit, wherein the conduit and the support member are bendable.

BACKGROUND ART

For example, machining lines, semiconductor manufacturing equipment, and electronic-component mounting apparatuses include robot travel devices for grasping and conveying workpieces such as workpiece materials, wafers, electronic components, substrates, etc. Robot travel devices include robots for handling, for example, workpieces, on travel carriages which are moving members to move back and forth on tracks.

To the travel carriages of such robot travel devices, electrical cables, optical cables, tubes for supplying hydraulic or pneumatic power, etc. (hereinafter, these cables, tubes, and etc. will be referred to as conduits) are connected. Even with respect to the travel carriages whose positions change by repeated reciprocating, connections using conduits need to be maintained stably. To this end, the conduits are supported by conduit support devices. The conduit support devices support predetermined lengths of conduits by U-shaped support members each of which consists of two straight parts facing each other and a curved part connecting them. The conduit support devices change the lengths of the straight parts facing each other according to the position of the travel carriage such that the stable connection of the conduits with the travel carriage whose position changes is maintained. Such conduit support devices can keep the curvature radiuses of conduits even when the positions of the travel carriages change. Therefore, while a signal transmission property and a transport property using the conduits are secured, breakage of the conduits is prevented.

Such conduit support devices include accommodation members capable of accommodating conduits and support members inside. Inside the accommodation members, conduits are stored along support members, whereby the curved shapes of the conduits are restricted to the same shapes as the curved shapes of the support members. Further, the accommodation members have the function of preventing dust such as abrasion powder attributable to deformation operations of the support members and so on from scattering around.

In such conduit support devices, the support members and the accommodation members are required to be highly reliable. For example, if the support members are broken during operation, they may damage the conduits or damage the qualities of workpieces. Even if the accommodation members are broken, the internal abrasion powder may scatter, causing serious damage, such as contamination of not only workpieces in process but also the surrounding environment.

Meanwhile, in order to achieve high productivity, conduit support devices are required to cope with longer reciprocating distance (an increase in the length of stroke) and faster movement. Further, the conduit support devices are required to stably operate over a longer period of time even under such conditions with increased mechanical load. As mentioned above, the demand for improved reliability of conduit support devices is increasing.

In Patent Literature 1, there is disclosed a conduit support device including a support member having a flexible material and non-interlocking solids attached to the flexible material. The flexible material is made of, for example, stainless steel or spring steel, and the non-interlocking solids are made of, for example, a metal material or a resin material having high compression resistance. The support member has a configuration in which if the non-interlocking solids come into contact with each other, bending to a certain direction is restricted, and if the non-interlocking solids are separated from each other, bending to the opposite direction is possible. There is disclosed that as the result, it is possible to provide a support member which realizes high flexibility, low mechanical noise, a small bend radius, and long life, a long lifespan and substantially does not produce abrasion powder containing particulate matter attributable to abrasion, etc.

In Patent Literature 2, there is disclosed an articulated cables-and-the-like protecting and guiding apparatus in which connector units integrally hold articulated end portions of an articulated support member, cable end portions of cables and the like, and slot end portions of a flexible belt member and seal the slot end portions of the flexible belt member, in order to prevent abrasion powder from scattering to the outside.

In Patent Literature 3, there is disclosed a flat cable for wiring movable parts configured for suppressing wear and dust attributable to wear such that round tubes which cables for wiring movable parts can be inserted into and be removed from and rectangular tubes which support members can be inserted into are arranged in parallel (see FIG. 21). There is disclosed that since the flat cable has an inner layer made of a fluorine resin on the inner peripheries of the rectangular tubes, it is possible to suppress wear attributable to contact with the support members and dust attributable to wear.

PRIOR ART DOCUMENTS

Patent Literature

Patent Literature 1: Japanese Patent Application National Laid-Open No. 2006-507788
Patent Literature 2: Japanese Patent Application Laid-Open No. 2012-170245
Patent Literature 3: Japanese Patent Application Laid-Open No. 2017-21903

SUMMARY OF INVENTION

Problem to be Solved by the Invention

However, these conduit support devices disclosed in the literatures have room for improvement in terms of reliability. In particular, in the case where a large mechanical load is applied by a support member, and/or in the case where a stable continuous operation is required for a longer period of time, it was difficult to secure sufficient reliability.

An object of the present invention is to provide a conduit support device having high reliability even under severe conditions.

Means for Solving the Problem

According to an aspect of the present invention, it is provided a conduit support device including a conduit, a support member configured to extend along a longitudinal direction of the conduit, and integrally support the conduit, and be capable of being bent at an arbitrary position in the longitudinal direction, and an accommodation member within which the conduit and the support member are stored, wherein an intermediate member is disposed between the support member and the accommodation member.

The support member may be configured to be capable of being bent in a first direction up to a predetermined curvature and maintain a straight shape without being bent in a second direction which is the opposite direction to the first direction, and the conduit support device may include an area which is positioned at an inner periphery side of bending when the support member is bent, and has the intermediate member between the support member and the accommodation member, and an area which is positioned at an outer periphery side of bending when the support member is bent, and has no intermediate member between the support member and the accommodation member.

The support member and the intermediate member may be configured such that sliding according to bending of the support member can occur between them, and the intermediate member and the accommodation member may be configured such that sliding according to bending of the support member can occur between them.

An amount of sliding which occurs between the intermediate member and the accommodation member may be larger than an amount of sliding which occurs between the support member and the intermediate member.

The support member may include a trapping layer capable of trapping particles existing inside the accommodation member.

The trapping layer may be made of an adhesive substance.

The trapping layer may be made of a substance which is semisolid at an ordinary temperature, and be formed as a layer having a thickness of 10 μm or greater.

The conduit support device may include a trapping-layer formation area which is included in an internal area of a valley-shaped part formed by a surface of the support member and an end of the intermediate member and has the trapping layer, and a trapping-layer non-formation area which is included in an area where the support member and the accommodation member are in contact with each other and has no trapping layer.

The accommodation member may include a first accommodation chamber where the support member is stored, and a second accommodation chamber where the conduit is stored, and the first accommodation chamber may include the intermediate member between the support member and the accommodation member, and the second accommodation chamber may not include the intermediate member between the conduit and the accommodation member.

The accommodation member may be made from an inner sheet which is positioned at an inner periphery side of the bending of the support member, and an outer sheet which is positioned at an outer periphery side of the bending of the support member, and the accommodation member may include a plurality of joint areas formed by bonding the inner sheet and the outer sheet, and a plurality of accommodation chambers formed between the joint areas, and the support member and the conduit may be stored in the plurality of accommodation chambers, respectively.

The outer sheet may be made from a sheet having stretchability higher than that of the inner sheet.

The accommodation member may include a first joint area and a second joint area defining an accommodation chamber for accommodating the support member, and in a cross-sectional view of the conduit support device 1 as seen from a longitudinal direction of the conduit support device, a length along the inner sheet between the first joint area and the second joint area may be shorter than a length along the outer sheet between the first joint area and the second joint area.

Effect of the Invention

According to the aspect of the present invention, it is possible to provide a conduit support device having high reliability even under severe conditions.

EMBODIMENTS FOR CARRYING OUT THE INVENTION

Hereinafter, embodiments of the present invention will be described in detail with reference to the drawings. However, the embodiments to be described below do not limit the inventions of claims, and all combinations of features described in the embodiments are not necessarily essential to the means for the solution of the invention. Further, the individual embodiments of the individual examples may be freely combined without losing technical meaning of the present invention.

Figure 1:
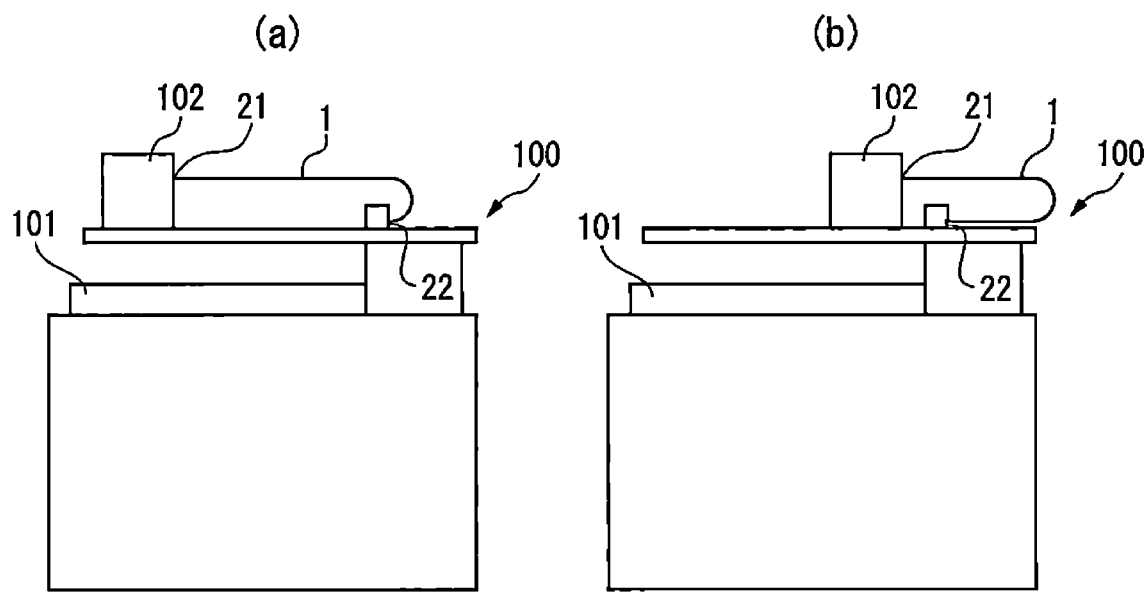
FIG. 1 is an overview diagram of a processing apparatus of the present invention.

FIG. 1 is an overview diagram of a processing apparatus 100 including a conduit support device 1. The processing apparatus 100 includes a stage 101 on the main body, and on the stage 101, workpieces (not shown in the drawing) can be disposed. The processing apparatus 100 includes a processing head 102 relatively movable with respect to workpieces, as shown in FIG. 1. The processing head 102 includes, for example, a workpiece holding means such as a robot hand, a means for irradiation with an electromagnetic wave such as a monochromatic ray or an X-ray, or an acquiring means such as a camera or a detector, and is configured to be movable to a position corresponding to an arbitrary position on a workpiece. One end of the conduit support device 1 is connected as a fixed end to the main body of the processing apparatus 100, and the other end is connected to the processing head 102. As the processing head 102 moves, a curved part of the conduit support device 1 moves while keeping a predetermined radius, and at the same time, the lengths of two straight parts facing each other change, so it is possible to maintain the stable connection between the processing apparatus 100 and the processing head 102.

The distance (stroke amount) between both end positions of reciprocating of the processing head 102 in the left-right direction of FIG. 1 is, for example, 0.3 m or more, and may be 1 m or more. For example, if the processing apparatus is a liquid crystal panel processing apparatus, the processing head has a maximum movement distance of 3 m or more. Further, although the example in which the whole movement range of the processing head 102 is arranged only on one side as seen from the fixed end is shown in FIG. 1, the processing head 102 may be configured to be movable across the areas on both sides of the fixed end.

By the way, the processing apparatus 100 of FIG. 1 is an example of a processing apparatus, and the curved shape of the conduit support device 1 can be arbitrarily set according to the configuration of the processing apparatus 100. Therefore, the shape of the conduit support device 1 is not limited to a U shape as shown in FIG. 1, i.e. a shape composed of two parallel straight parts and a curved part connecting them. Also, the movement direction of the processing head 102 is not limited to the horizontal direction. For example, a configuration in which the conduit support device 1 is composed of a horizontal part, an inclined part, and a curved part positioned between them, and the processing head 102 is positioned on one end side of the horizontal part, and the horizontal part and the inclined part form an acute angle of, for example, 45°, and the processing head 102 moves obliquely upward while the length of the horizontal part decreases can be considered. Also, it is possible to configure a conduit support device 1 in a U shape or inverted U shape in which two straight parts extend in the vertical direction such that the processing head 102 moves in the vertical direction.

Figure 2:
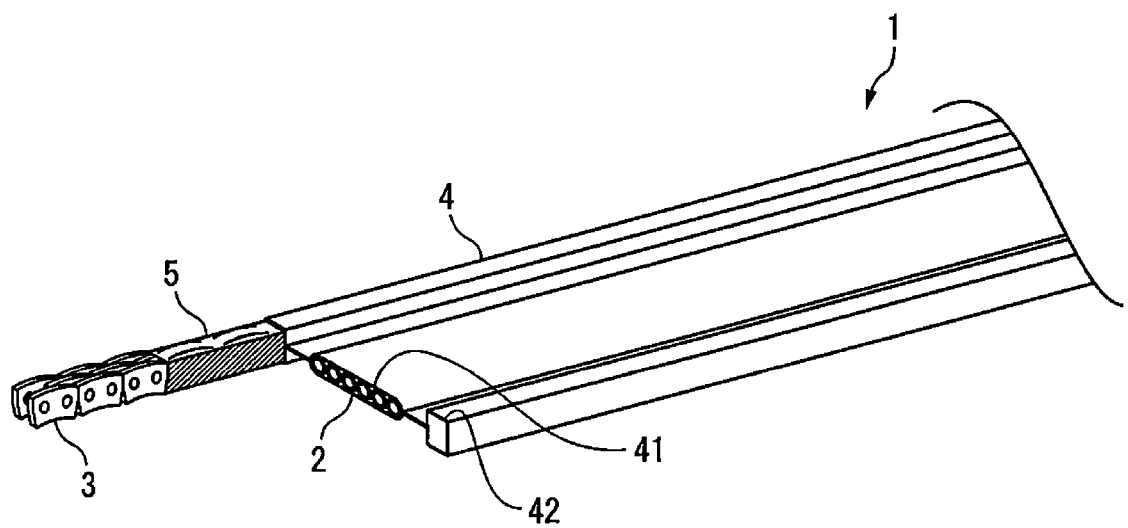
FIG. 2 is a perspective view illustrating the basic configuration of a conduit support device 1 of the present invention.

FIG. 2 is a perspective view illustrating the basic configuration of the conduit support device 1. The conduit support device 1 includes a conduit 2, a support member 3, an accommodation member 4 (also referred to as a conduit bag or a protective bag), and an intermediate member 5 (also referred to as a protective tool).

The conduit 2 is a kind of cable or tube, and is for conducting at least one of groups composed of signals using electricity, light, or the like, energy such as electric power, gases, and liquids. The object to be conducted by the conduit 2 is appropriately determined according to the apparatus in which the conduit support device 1 is installed. The conduit 2 has a first terminal 21 and a second terminal 22 at both ends, which are connected to two terminal connection parts of the processing apparatus such as a machining line whose positions relative to each other change, respectively (FIG. 1).

As described above, the support member 3 is an elongated member for supporting the conduit 2 in the state where it is curved in a U shape composed of two straight parts and a curved part connecting them in order to maintain the stable connection between the apparatus such as the processing apparatus 100 and the conduit 2 ((a) and (b) of FIG. 1). By using the support member 3, the shapes of the conduit 2, the accommodation member 4, and the intermediate member 5 are restricted by the deformation shape of the support member 3. Therefore, it becomes possible to maintain the stable connection between the conduit 2 and the apparatus such as the processing apparatus 100, even during repeated reciprocating of the conduit support device 1. The support member 3 is, for example, a member composed of a plurality of fixed-shape parts, and joint parts formed between the plurality of fixed-shape parts.

The accommodation member 4 includes a conduit accommodation part 41 for accommodating the conduit 2, and a support member accommodation part 42 formed along the conduit accommodation part 41 so as to accommodate the support member 3. The conduit accommodation part and the support member accommodation part have accommodation chambers inside. The accommodation chambers are cylindrical spaces extending along the longitudinal direction of the conduit support device, and can accommodate one or more conduits 2 or one or more support members 3. Since the accommodation member 4 has the conduit accommodation part 41 and the support member accommodation part 42 to separately accommodate the conduit 2 and the support member 3, stable continuous operation becomes possible, and the reliability of the conduit support device 1 improves.

The number of conduit accommodation parts 41 may be one or more. Also, in the conduit support device 1 shown in FIG. 2, the conduit 2 is provided between two support members 3. Applications other than the configuration of FIG. 2 will be described in detail below.

The accommodation member 4 is made from a flexible sheet-like member. For example, a member having such flexibility that bending with a curvature radius of 3 cm is possible and such durability that damage such as breakage does not occur even though the bending/unbending operation between the curved shape and the straight shape is performed 100,000 times is preferable. Also, it is preferable that the accommodation member 4 should have such a barrier property that it does not substantially allow water to permeate. Also, from the point of view of detectability in the event of breakage or contamination, it is preferable that at least 90% of the area of the surface of the accommodation member 4 should be formed in the same color and the accommodation member should not have any pattern distinguishable by the naked eye. For the same reason, it is preferable that its color should be white, black, or any mixed color thereof, i.e. an achromatic color.

As examples of the material of the accommodation member 4, general-purpose plastics such as polyvinyl chloride resin (PVC), polyethylene resin (PE), polypropylene resin (PP), polystyrene resin (PS), and ABS resin (ABS), engineering plastics such as polymethyl methacrylate resin (PMMA), polyacetal resin (POM), ultra-high molecular weight polyethylene (UHPE), polyamide synthetic resin (PA, for example, PA66), and polybutylene terephthalate (PBT), super engineering plastics such as liquid crystal polymer (LCP), polyphenylene sulfide resin (PPS), polyether ether ketone resin (PEEK), fluorine resin (for example, polytetrafluoroethylene (PTFE)), thermosetting plastics such as polyurethane, and so on can be taken. As PTFE, stretched ePTFE (expanded polytetrafluorethylene) also can be used. PTFE has the advantage of being more rigid as compared to ePTFE, and ePTFE has the advantage of being more flexible as compared to PTFE. As PE, HDPE (high-density polyethylene) has advantages such as low price and low friction.

The accommodation member can also be composed of a plurality of layers. For example, the exposed layers on the surfaces may be composed of layers containing a fluorine resin with an excellent sliding property as a main component, and the inner layer may be composed of a layer containing, as a main component, a resin having elasticity higher than that of the fluorine resin. By using a plurality of layers, for example, by configuring a three-layer structure having a middle layer made of polyurethane and interposed between an inner layer and an outer layer formed of ePTFE, it becomes possible to suppress the cost while adding functions to each layer, and it is possible to add characteristics such as sliding and low friction.

As shown in FIG. 2, the conduit support device 1 according to the embodiment of the present invention has the intermediate member 5 between the support member 3 and the accommodation member 4. This intermediate member 5 suppresses contact between the support member 3 and the inner surface of the accommodation member 4. Therefore, it is possible to provide the conduit support device 1 capable of suppressing damage of the accommodation member 4 attributable to friction with the support member 3 during the operation of the conduit support device 1 and having high reliability.

By the way, it is preferable that the intermediate member 5 should be formed over the entire length of the support member 3; however, it does not necessarily need to be formed over the entire length of the support member 3. The intermediate member may be formed in at least a part of an area where bending of the support member 3 occurs during the operation of the processing apparatus 100, and it is particularly preferable that the intermediate member should be formed over the entire area where bending of the support member 3 occurs during the operation. Also, it is preferable that in these formation areas, the integral intermediate member 5 should be formed continuously in the longitudinal direction of the support member 3.

Figure 3:
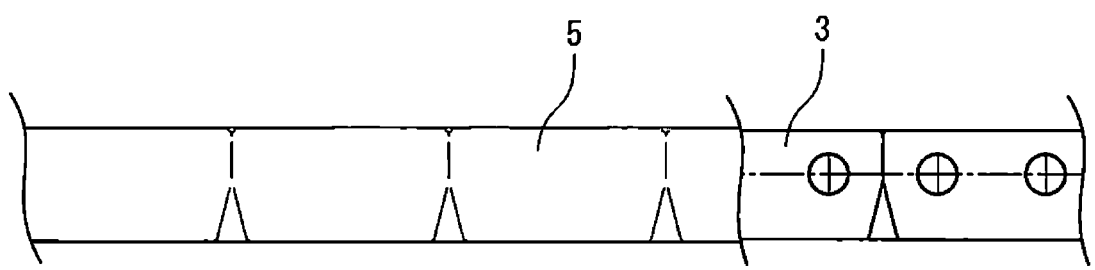
FIG. 3 is a partial cutaway view of an example of the present invention having an intermediate member 5 between a support member 3 and an accommodation member.
Figure 4:
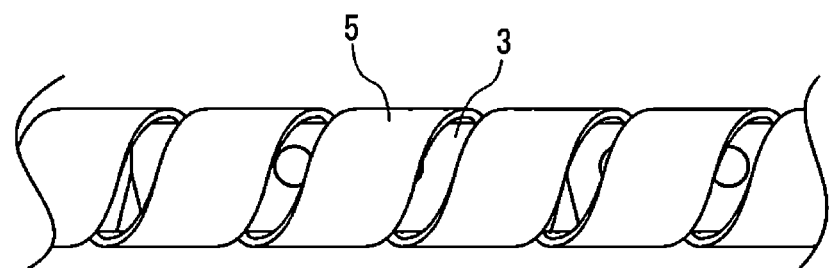
FIG. 4 shows another example which is an embodiment of the present invention and has an intermediate member 5 between a support member 3 and an accommodation member.

With reference to FIG. 3 and FIG. 4, the intermediate member 5 of the embodiment of the present invention will be described in more detail. In FIG. 3 and FIG. 4, for explanation, the accommodation member 4 which is disposed on the outer periphery of the intermediate member 5 is omitted.

In FIG. 3, as the intermediate member 5, a bag-like member (a tube) is used. If the bag-like member is used as the intermediate member 5, even in the case where the support member 3 has a partially protruding structure, the outer periphery of the support member 3 including the protruding structure part is covered, so it is possible to stabilize and suppress friction of the accommodation member 4.

This conduit support device 1 can be obtained by forming first the intermediate member 5 over a predetermined length of the support member 3 so as to cover the outer periphery of the support member 3, and then storing the support member 3 with the intermediate member 5 in the accommodation member 4. Formation of the intermediate member 5 on the support member 3 may be insertion of the support member 3 into a tube formed in a pipe shape or a bag shape. Alternatively, the intermediate member may be formed by winding a belt-like sheet so as to cover the outer periphery of the support member 3 and joining an end area of the sheet to another area of the sheet. For example, the intermediate member 5 may be formed by disposing a long side of the belt-like sheet in parallel with the longitudinal direction of the support member 3, and then winding the sheet around the outer periphery of the support member 3. Alternatively, the intermediate member 5 may be formed by interposing the support member 3 between two or more belt-like sheets and joining the belt-like sheets at both ends.

As the pipe-like or bag-like member for forming the intermediate member 5, a shrinkable tube may be used. In this case, it is possible to dispose the intermediate member 5 around the support member 3 by inserting the support member 3 into the bag-like member and shrinking the bag-like member. As the shrinkable tube, a heat-shrinkable tube which shrinks by heating is particularly preferable. In the case of using a heat-shrinkable tube as the intermediate member 5, it is possible to improve the adhesion between the support member 3 and the intermediate member 5, so occurrence of creases on the inner periphery of rotation bending is suppressed without obstructing the bending operation.

On the surface of the support member 3 shown in FIG. 4, a belt-like covering material is formed as the intermediate member 5 in a spiral shape around the support member 3. Since the intermediate member 5 is formed in the spiral shape, even in the case where the stretchability of the material constituting the intermediate member 5 is low, the winding pitch of the spiral changes, so it is possible to easily follow change in the shape of the support member 3, such as bending.

This intermediate member 5 can be formed by inserting the support member 3 into a belt-like covering material formed in the spiral shape in advance. Alternatively, the intermediate member can be formed by winding a belt-like covering material softened by heating or the like in a spiral shape around the support member 3 and hardening it by cooling or the like to fix the shape. In the case of using a belt-like covering material wound around the support member 3 as the intermediate member 5, it becomes possible to secure flexibility as compared to the case of covering the whole of the support member 3.

In the case of forming the intermediate member 5 with a spiral covering material as described above, covering may be performed such that when the support member 3 is in the straight state, there is no gap in the spiral covering material, or covering may be performed in view of ease of bending such that there are some gaps in the spiral covering material.

It is preferable that the intermediate member 5 should be more flexible than the accommodation member 4. For example, the flexural modulus of the intermediate member 5 may be set to be smaller than the flexural modulus of the accommodation member 4. In this case, even when the intermediate member 5 is introduced, it is possible to suppress deterioration of the bending operation or extending operation of the conduit support device.

The stretchability of the intermediate member 5 may be higher than the stretchability of the accommodation member 4. For example, the tensile modulus of the intermediate member 5 may be smaller than the tensile modulus of the accommodation member 4. In this case, it is possible to restrain the intermediate member 5 from obstructing the bending operation of the conduit support device by stretching on the outer periphery side of bending, and formation of creases of the intermediate member 5 on the inner periphery side of bending also is suppressed, and biting of the joint parts of the support member 3 and so on also are suppressed.

At least the surface of the intermediate member 5 on the outer side (the side abutting on the accommodation member 4) may satisfy one or more of higher smoothness, a smaller friction coefficient, and/or lower surface roughness (for example, arithmetic average roughness Ra) as compared to the surface of the accommodation member 4 on the inner side (the side abutting on the intermediate member 5). If the intermediate member 5 has this configuration, it is possible to reduce restrictions on the configuration and selection of the material of the accommodation member 4, and it is possible to provide a conduit support device having high reliability.

When the thickness of the area of the accommodation member 4 abutting on the support member 3 is referred to as Tb, it is preferable that the thickness Tm of the intermediate member 5 should be equal to or larger than 0.6 times Tb, and it is more preferable that Tm should be equal to or larger than 0.8 times Tb. Since the intermediate member 5 has a predetermined thickness, even if the surface of the support member 3 has a large uneven shape, it is possible to absorb at least a part of the unevenness by the thickness of the intermediate member 5, and it is possible to suppress damage of the accommodation member 4 or the intermediate member 5 attributable to friction.

It is preferable that the thickness Tm of the intermediate member 5 should be equal to or smaller than 1.5 times Tb, and it is more preferable that Tm should be equal to or smaller than 1.2 times Tb. At the time of bending, in the accommodation member, a difference in periphery length between the inner periphery surface and the outer periphery surface attributable to the diameter difference occurs. This difference in periphery length becomes a cause of wear and creases through the bending operation and the extending operation. In the case where the thickness Tm of the intermediate member 5 is too large, since the difference in diameter between the inner periphery surface and outer periphery surface of the accommodation member becomes large, the difference in periphery length also becomes large. In contrast with this, if the thickness of the intermediate member 5 is restricted within the above-mentioned range, it is possible to restrain the difference in periphery length between the inner periphery surface and outer periphery surface of the intermediate member from becoming too large.

As examples of the material of the intermediate member 5, general-purpose plastics such as polyvinyl chloride resin (PVC), polyethylene resin (PE), polypropylene resin (PP), polystyrene resin (PS), ABS resin (ABS), and polyethylene terephthalate (PET) can be taken.

As for the material of the intermediate member 5, similarly to the accommodation member 4, materials having wear resistance, low frictional properties, and chemical stability are preferable. Therefore, it is preferable to apply a member identical to the accommodation member as mentioned above, for example, PTFE or the like. However, also when the above-mentioned general-purpose plastics are appropriately selected according to the demand characteristics of each member, it is possible to obtain a conduit support device having equivalent or better characteristics at a lower cost.

In the present embodiment, the support member 3 and the intermediate member 5 are not bonded, and the intermediate member 5 and the accommodation member 4 are not bonded. Preferably, the support member 3 and the intermediate member 5 are configured such that sliding can occur therebetween, and the intermediate member 5 and the accommodation member 4 also are configured such that sliding can occur therebetween. When paying attention to a specific area of the conduit support device 1, the specific area repeats the bending operation and the extending operation with the operation of the processing apparatus 100. At this time, with the bending operation and/or extending operation of the conduit support device 1, a relative positional deviation occurs between the support member 3 and the accommodation member 4 due to the difference in the diameter of bending. In the conventional configuration having no intermediate member 5, sometimes, the deviation between the accommodation member 4 and the support member 3 caused long-distance sliding between the accommodation member 4 and the support member 3, and became a cause of excessive wear. In contrast with this, if the support member 3 and the intermediate member 5 are configured such that sliding can occur therebetween, and the intermediate member 5 and the accommodation member 4 are configured such that sliding can occur therebetween, it is possible to separately cause deviations at the two interfaces, so it is possible to reduce the amount of sliding at each interface, and it becomes possible to suppress wear.

This sliding can be intentionally increased or decreased by design. As an example of a preferred configuration related to sliding, a configuration in which sliding between the outer surface of the intermediate member 5 and the inner surface of the accommodation member 4 is larger than sliding between the inner surface of the intermediate member 5 and the outer surface of the support member 3 can be taken. If sliding between the outer surface of the intermediate member 5 and the inner surface of the accommodation member 4 is large, occurrence of creases on the inner periphery side of bending is suppressed without obstructing the bending operation.

The intermediate member 5 may be made of a plurality of layers. By combining a plurality of layers, it is possible to add functions such as having low friction characteristic to the surface while securing flexibility.

By the way, the intermediate member 5 may be disposed not only between the support member 3 and the accommodation member 4 but also between the conduit 2 and the accommodation member 4. In this case, it is possible to prevent wear between the accommodation member 4 and the conduit 2, and breakage.

Figure 5:
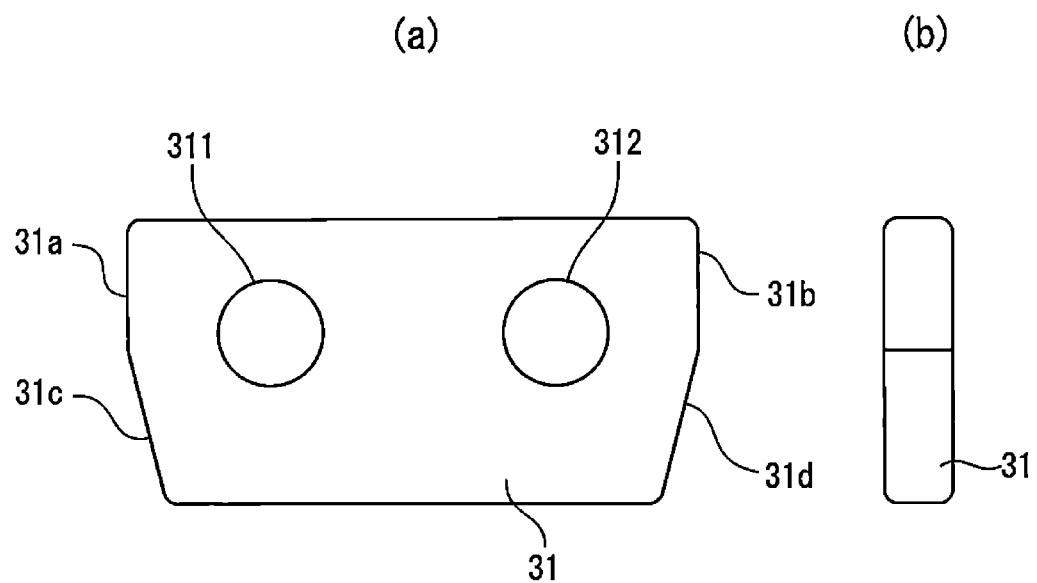
FIG. 5 includes a front view (a) and a side view (b) of an inner plate of an example of the support member 3 according to the embodiment of the present invention, respectively.
Figure 6:
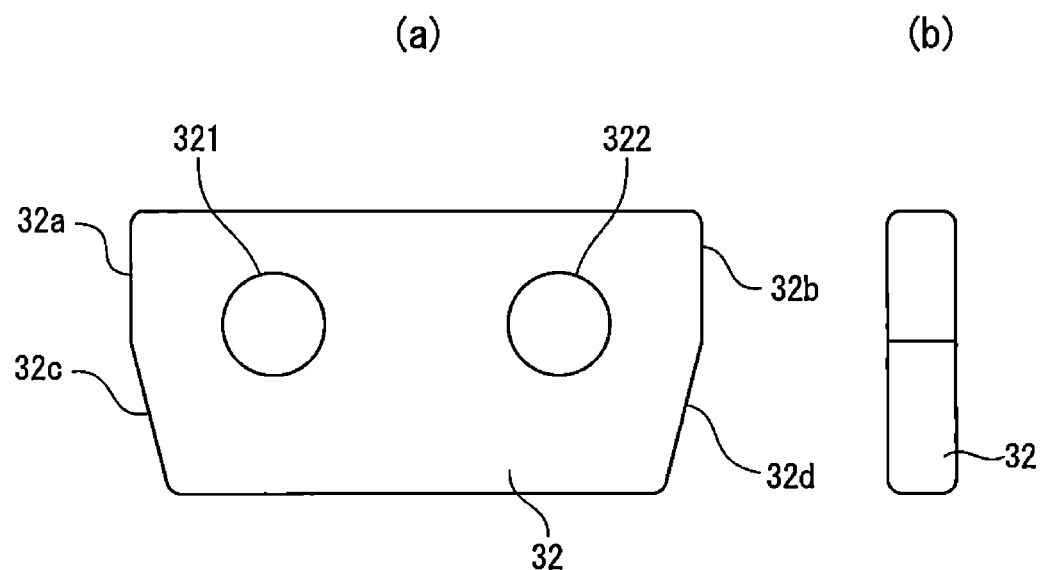
FIG. 6 includes a front view (a) and a side view (b) of an outer plate of the example of the support member 3 according to the embodiment of the present invention, respectively.
Figure 7:
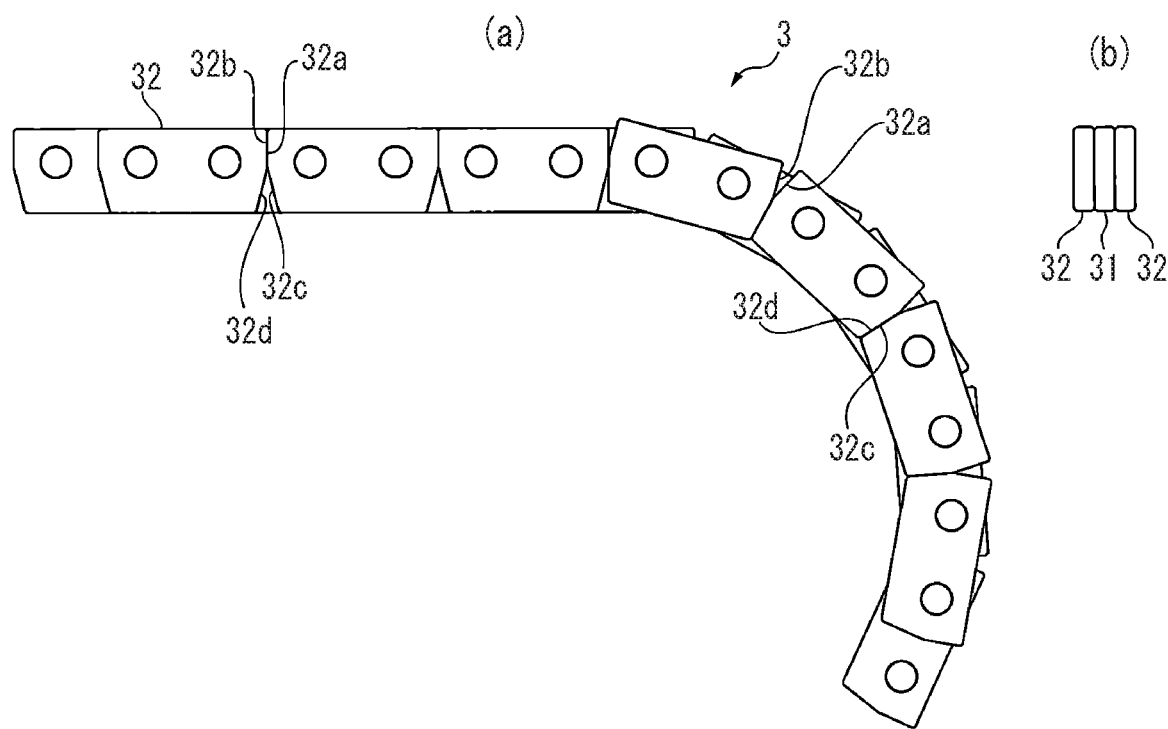
FIG. 7 includes a front view (a) and a cross-sectional view (b) of the example of the support member 3 according to the embodiment of the present invention, respectively.

Examples of the support member 3 to which the embodiment of the present invention can be applied and which is used in the conduit support device 1 are shown in FIG. 5 to FIG. 11. FIG. 5 to FIG. 7 show an example to which the embodiment of the present invention can be applied, and FIG. 8 to FIG. 10, and FIG. 11 show another example.

The support member 3 is configured such that in a predetermined direction, it maintains the straight shape such that further deformation is restricted, and in the opposite direction, it can be bent up to a predetermined curvature. The support member 3 includes a plurality of fixed-shape parts, and joint parts formed between the plurality of fixed-shape parts. The support member 3 is bent at a number of joint parts, thereby being curved in a polygonal shape. Here, by making the internal angle of the polygonal shape sufficiently large, it is possible to form a curve approximate to a smooth circle. The internal angle is 120 degrees or larger, preferably, 150 degrees or larger. Specifically, the support member 3 is configured in a chain shape by stacking about two or three metal plates, each of which has two connection holes, in the thickness direction and connecting the connection holes such that they are shifted in the longitudinal direction of the support member 3. Since the relative angles and positions of adjacent fixed-shape parts are restricted by contact with each other on the basis of the shapes of the fixed-shape parts, maintenance and regulation of the straight shape and curved shape of the support member 3 are achieved.

With respect to the example of FIG. 5 to FIG. 7, the support member 3 shown in FIG. 7 is configured by stacking three plates in the thickness direction of the plates (the traverse direction relative to the longitudinal direction which is the movement direction of the support member 3) such that each inner plate 31 as shown in FIG. 5 is disposed in the middle and outer plates 32 as shown in FIG. 6 are disposed on both sides thereof. The inner plates 31 and the outer plates 32 are formed to have approximately rectangular shapes. Each inner plate 31 has connection holes 311 and 312, and abutting surfaces 31a, 31b, 31c, and 31d to abut on adjacent inner plates 31. The abutting surface 31a of each inner plate 31 abuts on the abutting surface 31b of an adjacent inner plate 31, so the support member 3 cannot be deformed upward (on the drawing sheet). As for deformation in the opposite direction, since the abutting surface 31c of each inner plate 31 abuts on the abutting surface 31d of an adjacent inner plate 31, the support member 3 cannot be deformed beyond a predetermined curved shape.

Similarly, the outer plates 32 have connection holes 321 and 322, and abutting surfaces 32a, 32b, 32c, and 32d, and since the abutting surfaces 32a, 32b, 32c, and 32d abut on each other, the deformation shape of the support member 3 is restricted. Into the connection holes 311 and 312 of the inner plates 31 and the connection holes 321 and 322 of the outer plates 32, pins (not shown in the drawings) are fit. The connection holes 311, 312, 321, and 322 with the pins fitted serve as rotatable joint parts, whereby the inner plates 31 and the outer plates 32 are connected to each other and the bendable support member 3 is configured. By the way, the inner plates 31 in the middle, and the outer plates 32 on both sides have the same shape; however, the sizes of the connection holes 311 and 312 and the connection holes 321 and 322 are slightly different. As the features of this example, it can be cited that manufacturing and assembling are easy since the shapes are relatively simple rectangular shapes, and predetermined performance in which bending is possible only in one direction is easily achieved.

As the material of the metal plates, carbon steel such as S45C can be applied. Alternatively, special steel obtained by adding one or more elements of a group consisting of silicon, manganese, nickel, cobalt, chromium, tungsten, and molybdenum to carbon steel may be applied. These materials have high mechanical strength, and make it easy to achieve long stroke of the support device. Also, it is possible to apply stainless steel to achieve both of strength and corrosion resistance.

As the material of the metal plates, light alloys containing aluminum, titanium, or magnesium as a main component may also be applied.

Figure 8:
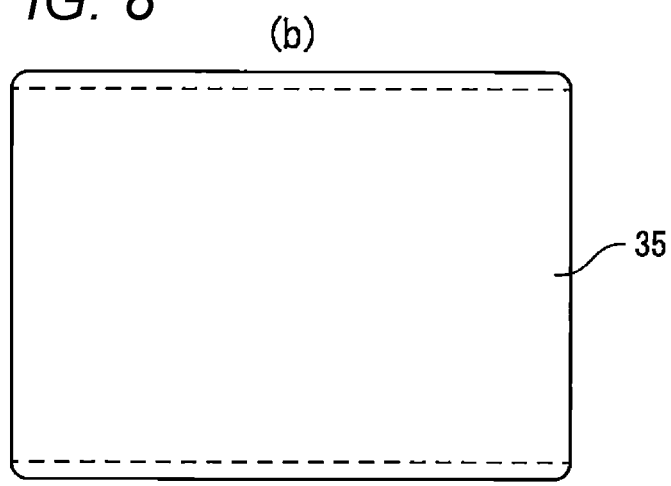
FIG. 8 includes a front view (a), a top view (b) and a cross-sectional view (c) of a block member of another example of the support member 3 according to the embodiment of the present invention, respectively.
Figure 8:
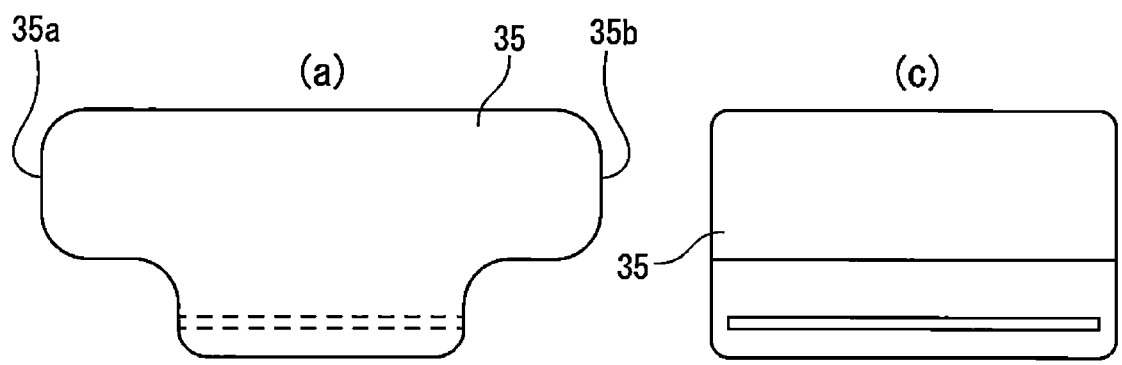
Figure 9:
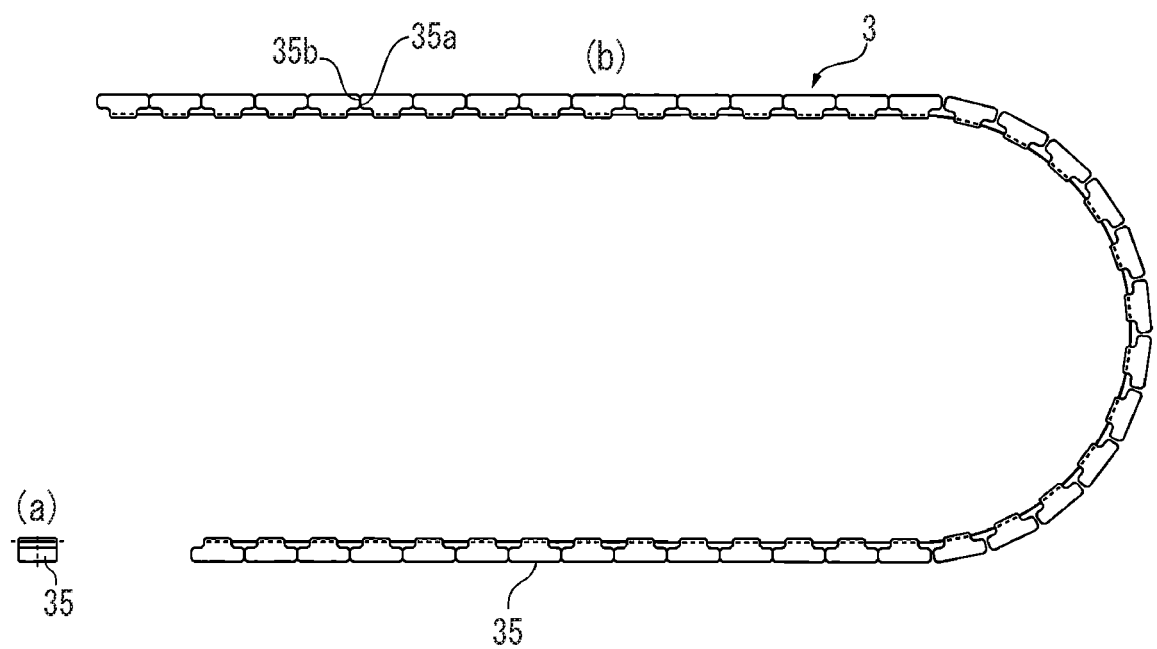
FIG. 9 includes a cross-sectional view (a) and a front view (b) of another example of the support member 3 according to the embodiment of the present invention, respectively.
Figure 10:
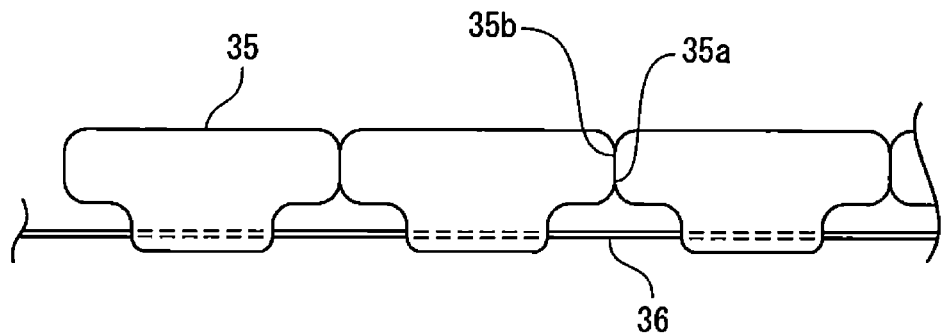
FIG. 10 is an enlarged view of the front of FIG. 9 which is another example of the support member 3 according to the embodiment of the present invention.

In FIG. 8 to FIG. 10, another example of the support member 3 to which the embodiment of the present invention can be applied is shown. This support member 3 is of the same type as that disclosed in Patent Literature 1 presented in the column of BACKGROUND ART. FIG. 8 shows a block member 35 which is disposed on a flexible material 36 and is a non-interlocking solid, and FIG. 9 shows a state in which the support member 3 includes a straight shape and a curved shape. FIG. 10 is an enlarged view of the straight part. Each block member 35 has abutting surfaces 35a and 35b. The abutting surface 35a of each block member 35 abuts on the abutting surface 35b of an adjacent block member 35, so the support member 3 cannot be deformed in a downward convex direction in FIG. 10. Therefore, the straight shape is maintained. Meanwhile, in the opposite direction, the support member 3 has no abutting surfaces for restricting the curved shape. Therefore, in the case of the support member 3 of the present example, unlike the above-mentioned example, bending in one direction (the downward convex direction in FIG. 10) is restricted to the straight shape, but the curved shape in the opposite direction is not restricted. The support member 3 has advantages that due to the simple structure, manufacturing is easy and the support member is lightweight.

Figure 11:
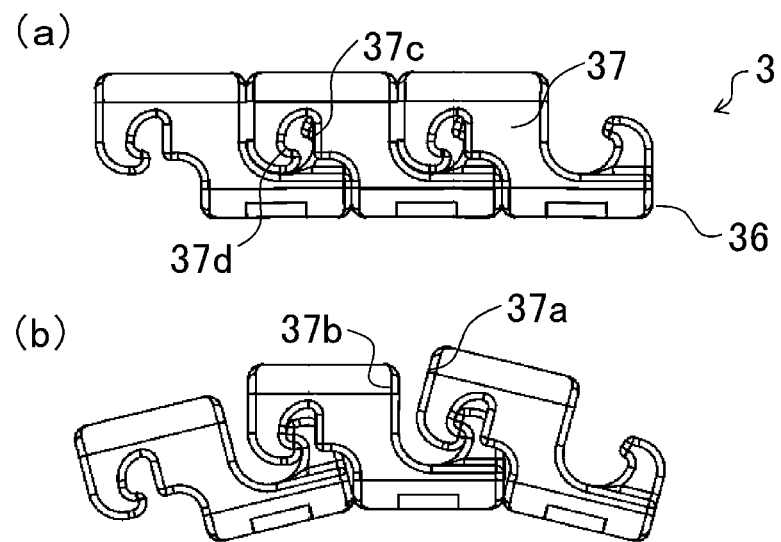
FIG. 11 includes front views of a further example of the support member 3 according to the embodiment of the present invention, and show the straight state (a) and the curved state (b), respectively.

In FIG. 11, another example of the support member 3 to which the embodiment of the present invention can be applied is shown. (a) of FIG. 11 is a front view of a straight part, and (b) of FIG. 11 is a front view of a curved part. This support member 3 has a plurality of block members 37 on a flexible material 36. The flexible material is made from, for example, a plate spring made of stainless steel, and the block members are made of, for example, a resin such as a liquid crystal polymer. In FIG. 11, although the flexible material 36 is blocked by the block members 37 and cannot be seen directly, at the position shown in (a) of FIG. 11, the flexible material extends in the longitudinal direction of the support member 3. The block members 37 of the present example have first abutting surfaces 37a and 37b to form pairs, and they abut on each other between adjacent block members so as to suppress bending in a predetermined direction, thereby maintaining the straight shape. The block members 37 further have second abutting surfaces 37c and 37d to form pairs, and can suppress breakage attributable to fatigue of the flexible material 36 and so on by regulating bending such that bending in the direction opposite to the predetermined direction beyond predetermined bending does not occur, i.e. the curvature radius does not become smaller than a predetermined curvature radius. This support member 3 has a long lifespan, and is of the same type as that disclosed in Patent Literature, International Publication No. WO2019/142929A1.

Figure 12:
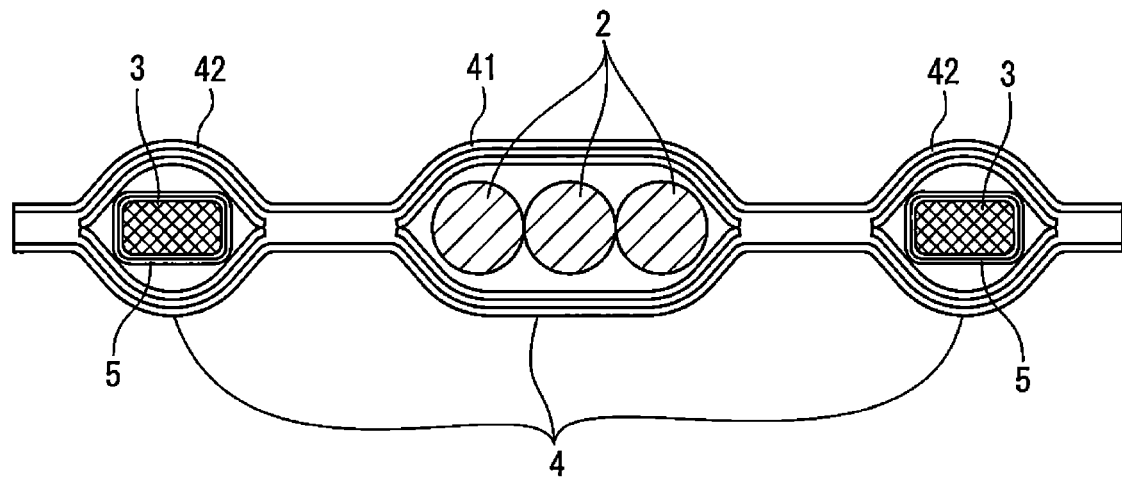
FIG. 12 shows a modification of the conduit support device 1 of the present invention.
Figure 13:
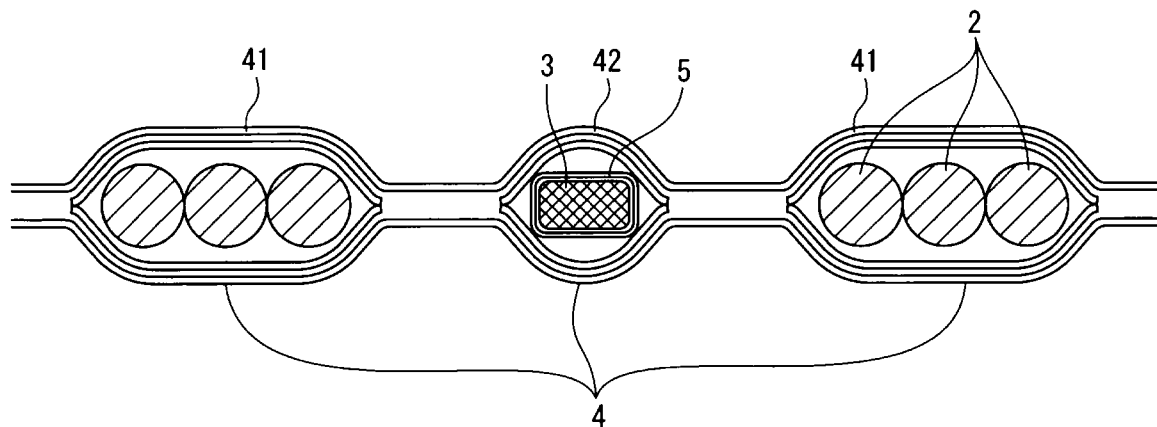
FIG. 13 shows another modification of the conduit support device 1 of the present invention.
Figure 14:
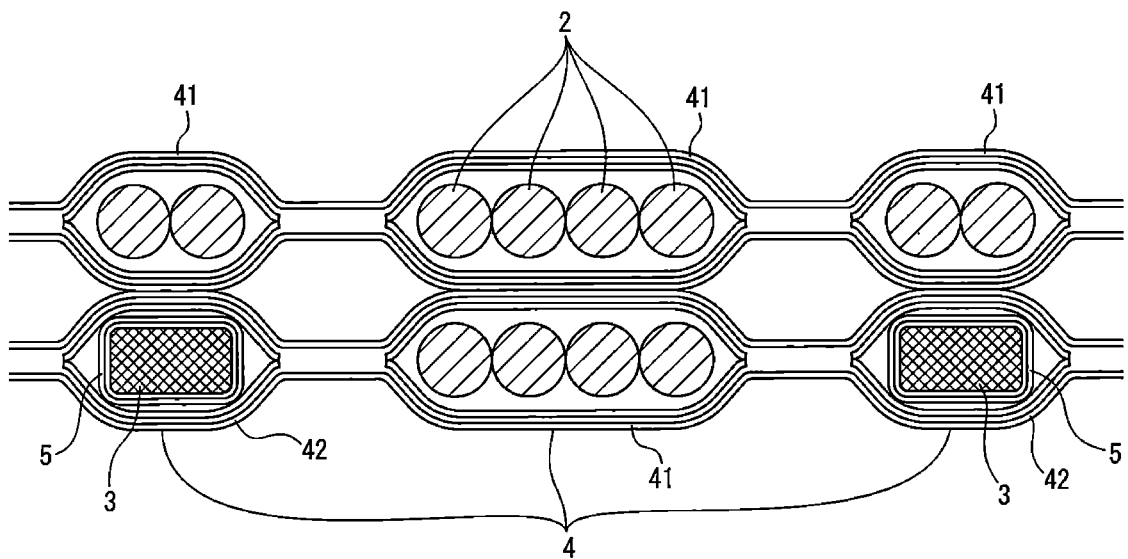
FIG. 14 shows another modification of the conduit support device 1 of the present invention.

Examples of application of the embodiment of the present invention are shown in FIG. 12, FIG. 13, and FIG. 14. As described above, the accommodation member 4 includes the conduit accommodation part 41 for accommodating the conduit 2, the support member accommodation parts 42 for accommodating the support member 3, and the intermediate member 5 formed between the support member 3 and the accommodation member 4.

The example shown in FIG. 12 is a cross-sectional view of an example in which a conduit accommodation part 41 is disposed in the center of the accommodation member 4, and on both sides thereof, support member accommodation parts 42 for accommodating support members 3 are provided. The example shown in FIG. 13 is a modification in which a support member accommodation part 42 for accommodating a support member 3 is disposed in the center of an accommodation member 4, and on both sides thereof, conduit accommodation parts 41 are provided. FIG. 14 is an example in which accommodation members 4 are combined into two stages. In this way, the embodiment of the present invention can be applied to accommodation members 4 and conduit support devices 1 having arbitrary arrangement configurations.

The intermediate member 5 may be formed not only between the support member 3 and the accommodation member 4 but also between the conduit 2 and the accommodation member 4. However, since the surfaces of conduits are generally flatter and softer than the surfaces of support members, it is easy to ensure the reliability of the conduit accommodation parts 41 as compared to the support member accommodation parts 42. Excessive introduction of intermediate members 5 increases the weight of the entire conduit support device, and may increase the deformation resistance, so it is preferable that any intermediate member 5 should not be formed between a part or the whole of a conduit 2 and an accommodation member 4.

With reference to FIG. 15 to FIG. 20, another embodiment of the conduit support device 1 will be described. In these drawings, the lower side of each drawing is the inner periphery side of bending during use of the conduit support device 1 (see FIG. 1 for instance), and the upper side of each drawing is the outer periphery side of bending. In other words, the conduit support device 1 shown in the drawings can be bent in the upward convex direction of the drawings; however, bending in the downward convex direction of the drawings is regulated by the action of the support member 3 such that the straight shape is maintained.

Figure 15:
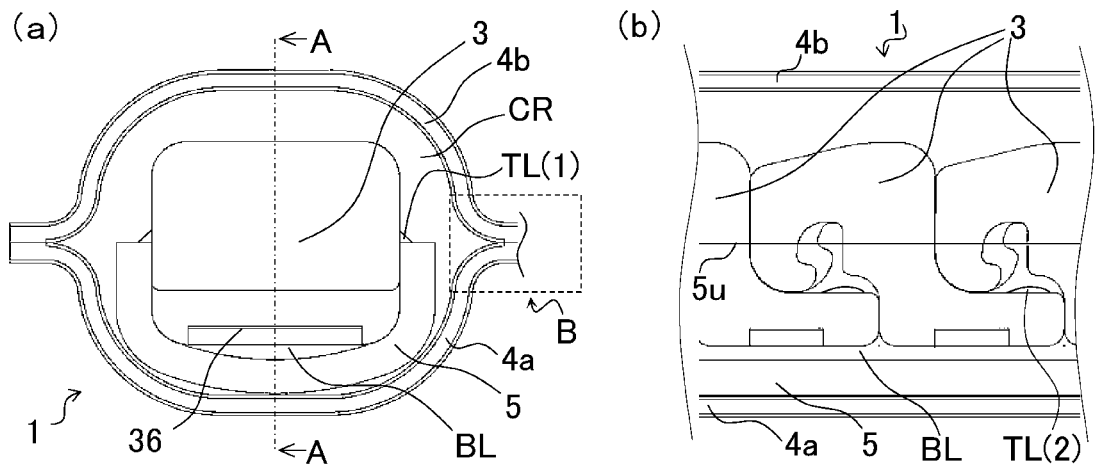
FIG. 15 shows another modification of the conduit support device 1 of the present invention.

(a) of FIG. 15 is a cross-sectional view of the conduit support device 1 of another embodiment as seen from its longitudinal direction, and (b) of FIG. 15 is a schematic diagram of the conduit support device 1 at the position of A-A of (a) of FIG. 15 as seen from the front, and is a view illustrating an overview of the positional relation of the support member 3, the accommodation member 4, and the intermediate member 5 in the height direction.

As shown in the drawing, the accommodation member 4 includes an inner sheet 4a positioned on the inner periphery side of bending and an outer sheet 4b positioned on the outer periphery side of bending. Between the inner sheet 4a and the outer sheet 4b, an accommodation chamber CR is formed, and in the accommodation chamber CR, the support member 3 is inserted. Further, the conduit support device 1 has one or more conduits stored in areas of the accommodation member 4 not shown in the drawing. Between the support member 3 and the accommodation member 4, the intermediate member 5 is formed.

Here, the example in which support members 3 including flexible materials 36, as shown in FIG. 11, are combined as support members 3 is shown; however, the support members are not limited thereto, and for example, other support members 3 shown in FIG. 5 to FIG. 10, and support members having other structures and having the same functions as those of them may be freely combined.

In the present embodiment, the conduit support device 1 includes an area having the intermediate member 5 between the support member 3 and the accommodation member 4 and an area having no intermediate member 5 between the support member 3 and the accommodation member 4. More specifically, the support member 3 of the conduit support device 1 includes an area positioned on the inner periphery side of bending of the conduit support device 1 and having the intermediate member 5, and includes an area positioned on the outer periphery side of bending and having no intermediate member 5. By having this configuration, it is possible to obtain the conduit support device with high reliability in which wear of the accommodation member 4 is significantly suppressed.

Hereinafter, the reason why wear of the accommodation member 4 is significantly suppressed in the present embodiment will be described.

In the curved-shape area of the conduit support device 1, the length of the support member 3 along the support member becomes smaller on the inner periphery side of the support member than on the outer periphery side. The reason why this length difference occurs is that not only the thickness of the support member 3 (the size in the upward and downward direction of the drawing) but also the diameter of the outer periphery side increases. Further, it is difficult to absorb the difference in length between the inner and outer peripheries of the support member 3 only by expansion and contraction of the accommodation member 4, and as a result, on the inner periphery side of the accommodation member 4, creases, i.e. corrugated patterns are formed to absorb the excess length. The inventors of this application found that these corrugated patterns may be fixed as a bending habit of the accommodation member 4 during repetition of bending and extension.

Further, they thought that if the position of an area abutting on the peaks of the corrugated patterns (areas including the vertexes of the shapes protruding toward the support member 3) is fixed, since the corresponding area repeatedly comes into contact with the inner periphery side of the support member 3 more strongly than the other area of the accommodation member 4 does, wear is likely to progress and the reliability of the accommodation member is reduced.

For this reason, the inventors of this application thought that it would be possible to further improve the reliability of the accommodation member by suppressing formation of fixed corrugated patterns. Since corrugated patterns are caused by the thickness of the support member 3 as mentioned above, it can also be considered to reduce the thickness of the support member 3; however, since the thickness of the support member is closely related to the mechanical strength of the support member, simply reducing the thickness causes a lack of strength of the support member, and causes problems such as a problem that it becomes impossible to secure the amount of stroke.

Even in the case of thinning the intermediate member 5, similarly to the case of reducing the thickness of the support member 3, although suppression of formation of corrugated patterns is expected, simply restricting the thickness of the intermediate member 5 becomes restrictions on design or material selection.

In the present embodiment, the conduit support device 1 includes the area which is positioned on the inner periphery side of the support member where corrugated patterns as mentioned above can be formed and has the intermediate member 5, and includes the area positioned on the outer side of bending and having no intermediate member 5. In this configuration, since the intermediate member 5 is formed on the inner periphery side where the influence of formation of corrugated patterns attributable to excess length of the accommodation member and wear attributable thereto is large, the reliability of that area improves, and since the area having no intermediate member 5 is included on the outer periphery side where the influence of such wear is small, it is possible to suppress an increase in the height of the support member including the intermediate member, and reduce actualization of corrugated patterns.

As mentioned above, the configuration including the area having the intermediate member 5 and positioned on the inner periphery side of the support member, and the area having no intermediate member 5 and positioned on the outer side of the bending can suppress actualization of corrugated patterns even in the case where the intermediate member 5 is thick, so it is particularly effective when the thickness or formation height of the intermediate member 5 is large. Typically, it is preferable to apply this configuration in the case where the thickness of the intermediate member is larger than the thickness of the area of the accommodation member 4 abutting on the support member 5.

The intermediate member 5 has a surface to abut on the support member 3 and a surface to abut on the accommodation member on its front and back. The intermediate member 5 is configured such that the intermediate member and the accommodation member can slide on each other at the interface. Further, the intermediate member 5 may be configured such that the intermediate member and the support member 3 can slide on each other at the interface. It is preferable that the intermediate member 5 should be configured such that when the intermediate member has a configuration in which sliding occurs on the front and back thereof, the amount of sliding on the accommodation member is larger than the amount of sliding on the support member.

The conduit support device 1 may include a buffer layer BL between the support member 3 and the intermediate member 5. In the present embodiment, the buffer layer BL is configured as an air layer such that deformation of the intermediate member 5 in the upward and downward direction of the drawing becomes easy, whereby it is possible to weaken contact of the accommodation member 4 with the peak areas of corrugated patterns.

Further, it is preferable that the buffer layer BL should extend continuously in the longitudinal direction of the support member, as shown in (b) of FIG. 15. According to this configuration, it is possible to alleviate the influence of shape change of the support member 3 which is an articulated member according to bending or extending and local shape change of the support member 3 toward the accommodation member.

It is preferable that in a cross section of the support member as seen from the longitudinal direction as shown in (a) of FIG. 15, the lower surface of the intermediate member 5 (when assuming a virtual circle including the curved shape of the conduit support device 1 as a part of the circumference, a surface of the surfaces of the intermediate member 5 facing the center of the virtual circle) should be composed of only a curved surface projecting downward. Further, it is preferable that a minimum curvature radius r1 of the curvature included in the curved surface projecting downward should be larger than a minimum curvature radius r2 of a curved surface included in the lower surface of the support member 3 and projecting downward (when assuming a virtual circle including the curved shape of the conduit support device 1 as a part of the circumference, a surface of the surfaces of the support member 3 facing the center of the virtual circle). According to this configuration, it is possible to increase the contact area between the support member 3 and the accommodation member 4, thereby restraining local hitting from becoming strong.

As this intermediate member 5, a member configured such that the cross section has the shape of alphabet C by slashing an arbitrary position on the circumference of a tube made of a resin along the longitudinal direction of the tube or cutting out a part can be used. From the position of the tube slashed or cut out, i.e. the notch, the support member 3 is fit into the tube, whereby it is possible to form an area having the intermediate member 5 and an area having no intermediate member 5 at arbitrary positions of the support member. As the material for forming the tube, resins having hardness lower than that of the material for forming the support member 3 are suitable, and the material of the tube may be PTFE, or may be ePTFE which is PTFE expanded in the longitudinal direction.

It is preferable that the formation height of this tube should be equal to or larger than 20% of the height of the support member 3 (the size in the upward and downward direction of the drawing) as shown by a reference symbol "5*u*" in (b) of FIG. 15, and it is particularly preferable that the formation height should be equal to or larger than 50%. By securing a predetermined fitting amount as described above, it is possible to restrain the intermediate member 5 from dropping out of the support member 3. Further, in the tube having the notch parallel to the longitudinal direction of the tube, even in the case where the formation height of the tube is large, since the width of the notch changes according to deformation of the support member 3 attributable to sliding, it is possible to maintain smooth sliding of the support member.

The tube may be fixed to the support member 3 with an adhesive or the like. Even in the case, it is possible to maintain smooth sliding of the support member by restricting adhesive-layer formation areas. For example, a configuration is possible in which as seen in a cross-sectional view, between the lower surface of the support member 3 and the intermediate member 5, an adhesive layer is formed, and between the side surfaces of the support member 3 (surfaces facing the ends of the tube) and the intermediate member 5, any adhesive layer is not formed. In other words, a configuration is preferable in which the side surfaces of the support member 3 as seen in a cross-sectional view and the areas of the tube around the notch are not fixed with respect to each other.

Figure 16:
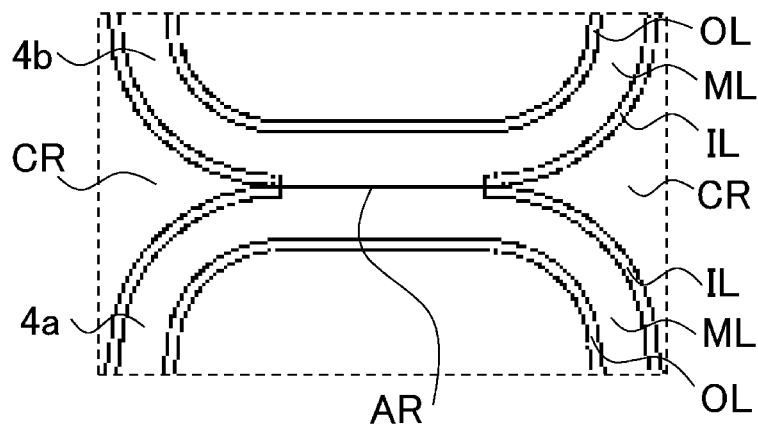
FIG. 16 is a view for explaining a region of FIG. 15 indicated by B.

With reference to FIG. 16, the structure of the accommodation member 4 in an area B surrounded by a broken line in (a) of FIG. 15 will be described. In the present embodiment, the accommodation member 4 is configured by bonding the inner sheet 4*a* and the outer sheet 4*b*. Each of the inner sheet and the outer sheet includes an inner layer IL, an outer layer OL, and a middle layer ML formed between the inner layer and the outer layer. The inner layer IL faces the accommodation chamber CR, and the outermost surface thereof comes into contact with the conduit 2, the support member 3, and/or the intermediate member 5 inserted in the accommodation chamber. The outer layer OL is exposed to the installation atmosphere of the conduit support device, and a part thereof may come into contact with the surface of the housing of the processing apparatus 100 (FIG. 1). For the inner layer IL and/or the outer layer OL, materials with excellent abrasion resistance and sliding properties, for example, ePTFE can be applied. For the middle layer ML, materials having flexibility and stretchability better than the inner layer IL and/or the outer layer OL has, for example, polyurethane can be applied.

The accommodation member 4 has a plurality of accommodation chambers CR.

The individual accommodation chambers CR are defined by joint areas AR where the inner sheet 4a and the outer sheet 4b are joined. More specifically, a space formed in a non-joint area between two joint areas AR by bulging the inner sheet 4a and the outer sheet 4b outward can be used as an accommodation chamber CR. The joint areas AR are formed along the longitudinal direction of the accommodation member so as to extend in parallel to each other. As a result, in the accommodation member 4, the accommodation chambers CR are formed along the longitudinal direction of the accommodation member, such that they extend in parallel to each other, and conduits and support members can be inserted into the accommodation chambers CR. For example, the joint areas AR can be formed by applying an adhesive between the inner layer IL of the inner sheet 4a and the inner layer IL of the outer sheet 4b and bonding both layers, but may also be formed by other methods such as welding using heating.

In the embodiment shown in FIG. 16, at the positions corresponding to the joint areas AR, the inner layer IL is not formed, and the middle layer ML of the inner sheet 4a and the middle layer ML of the outer sheet 4b are bonded with no inner layer IL therebetween. In this case, it is possible to secure adhesion strength, and it also is possible to achieve smooth operation by absorbing stress attributable to the behavior difference during sliding between the accommodation chamber containing the conduit 2 and the accommodation chambers containing the support members 3, even if the strength of the material applied to the inner layer IL is high. This structure can be obtained by preparing an inner sheet and an outer sheet having parts exposing the middle layers ML without no inner layer IL and joining the middle layers ML. For example, the middle layers may be thermally welded by rising the temperature to the melting point of the material forming the middle layers ML by local heating, or it is possible to apply a solvent capable of melting the middle layers ML and bond them.

Referring to FIG. 15 again, the support member 3 may include a trapping layer TL formed on the surface so as to trap particles generated inside the accommodation member.

The conduit support device 1 having the accommodation member with improved reliability can be used continuously for a long period as compared to the related art. The conduit support device 1 having a long lifespan can withstand at least 2 million times of reciprocating, and can withstand 10 million times of reciprocating depending on the conditions, without any problem; however, fine particles including abrasion powder of the support member 3 and the accommodation member 4, which is generated by sliding which is repeated for a long period (hereinafter, particles will be referred to simply as dust) may become a problem. In particular, since the support member is made of a material having high mechanical strength, particles generated in the form of dropping off from the support member or the like may accelerate wear of the support member and other members.

With respect to this, the conduit support device 1 includes the trapping layer TL. As a result, even if particles are generated inside the accommodation member, the generated particles are trapped by the trapping layer, so it is possible to suppress acceleration of wear and it is possible to discharge the dust to the outside of the accommodation member.

The configuration of the trapping layer TL is not limited as long as it can trap particles coming into contact with the surface, and for example, an adhesive substance can be applied. As the adhesive substance, a substance may be selected from rubber-based, acrylic, or silicone-based adhesives, depending on the usage environment and required characteristics. The trapping layer may be formed on the surface of the support member in the form of coating, transfer, or the like, or a conduit support device having a trapping layer may be configured by forming a trapping layer in one of various members to constitute the conduit support device and assembling it.

The support member 3 includes an area having the trapping layer TL, and an area having no trapping layer. Especially, in the case where the adhesion of the trapping layer is high, sliding or operation of the support member may deteriorate, or sliding of the support member and the accommodation member may deteriorate; however, if the formation area of the trapping layer TL is limited, it is possible to achieve smooth operation of the conduit support device while giving dust trapping performance. A trapping layer TL may be formed, for example, at the position indicated by TL(1) in (a) of FIG. 15, i.e. in the internal area of a valley-shaped part formed by the side surfaces of the support member 3 and the ends of the intermediate layer 5 as seen in a cross-sectional view along the longitudinal direction of the support member 3. Alternatively, trapping layers may be formed at the positions indicated by TL(2) in (b) of FIG. 15, i.e. in areas of the surfaces of the plurality of block members constituting the support member 3 which face the internal spaces of the plurality of block members and do not come into contact with other block members.

It is preferable that trapping layers TL should not be formed in areas where the support member and the accommodation member come into contact and areas where the block members abuts on each other. It is believed that even in the case where the trapping layers are formed in limited areas as mentioned above, as particles moves inside the accommodation member, they would be trapped by any of the trapping layers.

The trapping layer may be made of a layer made of a semisolid substance having a thickness of 10 μm (micrometers) or greater. Here, a semisolid substance indicates a substance which has a fixed shape at an ordinary temperature but is plastically deformed by a very small external force equivalent to, for example, a force which is applied when lightly pushing it with a fingertip. In the case of forming the trapping layers of such a substance, an adhesive property is not necessarily required. In the case of having such a trapping layer on the surface of the support member 3, particles such as dust are attached to the trapping layer, and is taken into the trapping layer by receiving external stress from the accommodation member and so on. In the case where the thickness is smaller than 10 μm, some particles are not taken into the trapping layer depending on the particle diameters, and detachment after trapping is likely to occur. Even in the case where liquid properties are too strong, the same is true, and sufficient dust trapping performance is not obtained.

Although the semisolid substance is not limited, for example, grease is suitable. Particularly, silicone oil grease obtained by adding a thickener to silicone oil is effective even in terms of stability and so on. Although the hardness of grease can be adjusted by the amount and type of thickener, for example, it is preferable that grease should have such hardness that worked penetration becomes equal to or lower than 400 at 25° C., and it is more preferable that grease should have such hardness that worked penetration becomes equal to or lower than 300 at 25° C. The penetration of grease can be measured by, for example, the method defined in JIS K 2220. Meanwhile, if grease is too hard, particles are unlikely to be taken into the trapping layers, so it is preferable that the worked penetration should be equal to or higher than at least 80, and worked penetration equal to or higher than 150 is particularly preferable. As examples of grease having such hardness, 41660 of SUPERLUBE (registered as a trademark) and so on can be taken.

In the case of using grease as trapping layers, it is possible to achieve trapping of particles and improvement of lubricity of sliding parts at the same time. Above all, the concern that the operation of the conduit support device would deteriorate due to adhesion between members is little. Therefore, it is possible to increase the trapping-layer formation area on the surface of the support member as compared to adhesive substances. However, for example, if a trapping layer is formed on the surface of the support member to abut on the block member, there is a risk that the motion range of the support member will change due to trapped particles. For this reason, it is preferable that the trapping layers TL should be formed in the internal areas of valley-shaped parts formed by the surfaces of the support members 3 and the ends of the intermediate layers 5, or areas of the surfaces of the plurality of block members constituting the support member 3 which face the internal spaces of the plurality of block members and do not come into contact with other block members.

Meanwhile, it is preferable that trapping layers TL should not be formed in areas where the support member and the accommodation member come into contact and areas where the block members abuts on each other. By the way, the case where trapping layers TL are not formed is not limited to the case where grease is not applied, and may include the case where the coating is made thinner than that in the area for forming the trapping layers TL such that trapping performance is restricted.

Figure 17:
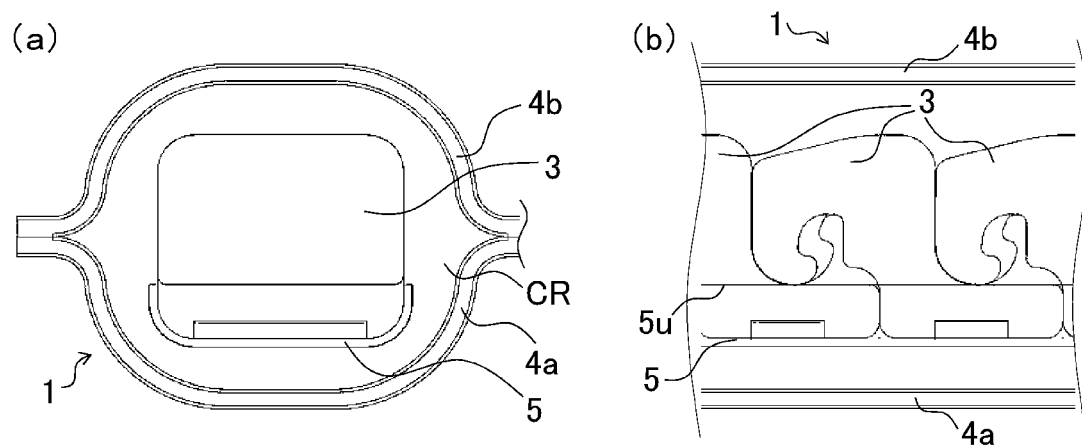
FIG. 17 shows another modification of the conduit support device 1 of the present invention.

(a) of FIG. 17 is a cross-sectional view of a conduit support device 1 of a further example as seen from the longitudinal direction thereof, and (b) of FIG. 17 is a schematic diagram of the conduit support device 1 of (a) of FIG. 17 as seen from the front, and is a view illustrating an overview of the positional relation of the support member 3, the accommodation member 4, and the intermediate member 5 in the height direction.

The conduit support device 1 of the present embodiment can have the same configuration as that of each conduit support device 1 mentioned above, except that the configuration of the intermediate member 5 is partially different.

Also in the present embodiment, the support member 3 of the conduit support device 1 includes an area having the intermediate member 5 and positioned on the inner periphery side of bending of the conduit support device 1, and includes an area having no intermediate member 5 and positioned on the outer periphery side of bending. Further, the intermediate member 5 of the present embodiment is fixed on the support member 3. The intermediate member 5 includes, for example, a body layer and an adhesive layer, and is bonded to the bottom surface of the support member 3 via the adhesive layer. The adhesive layer is formed all over one surface of the body layer, and can be stably fixed on the bottom surface of the support member 3. The body layer may contain, for example, a fluorine resin such as PTFE, and the adhesive layer may contain a silicon silicone resin. It is preferable to apply a non-hardenable layer as the adhesive layer, and it is particularly preferable that the thickness of the adhesive layer should be larger than the thickness of the body layer.

A conduit support device 1 having an intermediate member 5 fixed on a support member 3 can be easily obtained by attaching a commercially available tape to the bottom surface of the self-support member 3. As examples of suitable tapes, a NITOFLON ((registered as a trademark) adhesive tape and so on can be taken.

In the present embodiment, the intermediate member 5 may be formed so as to cover the side surface of the support member 3. For example, the intermediate member may be formed up to the height indicated by 5u in FIG. 17. However, if the intermediate member 5 having the adhesive layer is formed up to a high position of the support member, it obstructs the sliding operation of the support member or damage of the intermediate member occurs. For this reason, it is preferable that the formation height of the intermediate member 5 should be equal to or smaller than 30% of the height of the support member 3 (the size in the upward and downward direction in the drawing), and it is particularly preferable that the formation height should be equal to or smaller than 20%.

In the present embodiment, if the intermediate member 5 is thick, expansion and contraction of the intermediate member is restricted, or the intermediate member is likely to peel off, particularly, the side surface area of the support member by an external force attributable to contact with the accommodation member, etc. Therefore, it is preferable that the thickness of the intermediate member 5 should be smaller than the thickness of the inner sheet 4a of the accommodation member.

Figure 18:
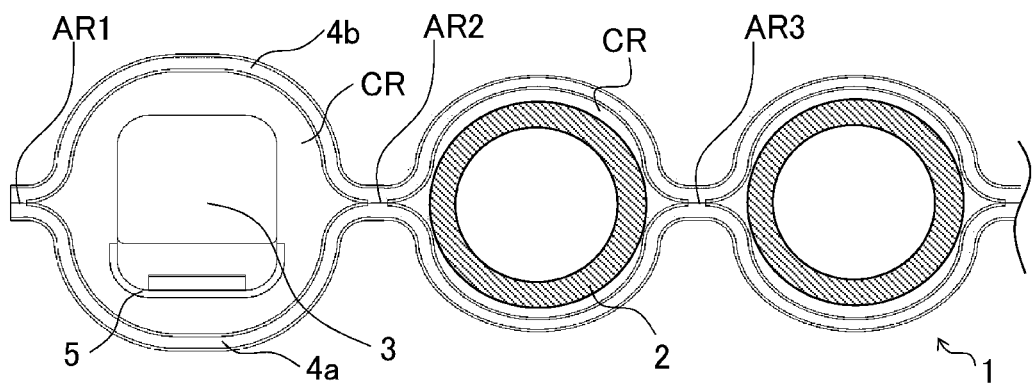
FIG. 18 shows another modification of the conduit support device 1 of the present invention.

Subsequently, the inventors studied a configuration in which contact of the accommodation member 4 with the peak areas of corrugated patterns is weakened by the structure of the accommodation member 4. FIG. 18 shows a still further example of the conduit support device 1, and is a cross-sectional view of the conduit support device 1 as seen from the longitudinal direction. The conduit support device 1 of the present embodiment can have the same configuration as that of each conduit support device 1 mentioned above, except that the configuration of the accommodation member is partially different.

The accommodation member of the conduit support device 1 shown in this drawing includes an inner sheet 4a to be positioned on the inner periphery side during bending, and an outer sheet 4b to be positioned on the outer periphery side during bending. The individual sheets are joined to each other at least in a joint area AR1, a joint area AR2, and a joint area AR3, and in the accommodation chamber CR between the joint area AR1 and the joint area AR2, a support member 3 is inserted, and in the accommodation chamber CR between the joint area AR2 and the joint area AR3, a conduit 2 is inserted. In the present embodiment, between the support member 3 and the accommodation member, an intermediate member 5 does not need to be necessarily formed; however, it goes without saying that if an intermediate member 5 is formed as shown in the drawing, higher reliability is obtained.

In the present embodiment, the aspect ratio of the support member 3 as seen in a cross-sectional view (a value obtained by dividing the size of the support member 3 in the upward and downward direction of the drawing by the size of the support member in the left-right direction of the drawing) is 0.7 or greater. A support member 3 having such a large aspect ratio has excellent long stroke adaptability, but there is a tendency that corrugated patterns on the accommodation member are likely to be actualized. In contrast with this, in the present embodiment, the length between the joint area AR1 and the joint area AR2 is set to be larger than the length between the joint area AR2 and the joint area AR3. Preferably, the length between the joint area AR1 and the joint area AR2 is equal to or larger than 1.2 times the length between the joint area AR2 and the joint area AR3. Here, the length between joint areas means the length between the joint areas in a state where the accommodation member 4 is flattened without inserting the support member and the conduit in the accommodation chambers. In the case where the support member 3 has an intermediate member 3, the aspect ratio of the support member 3 may be calculated on the basis of the shape including the intermediate member 3.

It is also effective to increase the dimensional margin of the accommodation chamber CR for accommodating the support member 3 having a large aspect ratio relative to the support member. In a cross-sectional view as seen from the longitudinal direction, the maximum cross-sectional area (hereinafter, referred to as $S_{CR}$) can be calculated as the area of a circle having the length of the inner periphery of the accommodation chamber as the circumference. When the cross-sectional area of a figure represented by the contour of the support member as seen from the longitudinal direction is referred to as $S_{SM}$, if $S_{CR}/S_{SM}$ is too large, there are problems such as the problem that deformation of the support member such as distortion is likely to occur in the accommodation chamber. For this reason, until now, the dimensional margin expressed as $S_{CR}/S_{SM}$ has been usually set to around 1.3. However, in the case of support members 3 having aspect ratios of 0.7 or greater as seen in a cross-sectional view, many of them are considered to be adaptable to long strokes, and although stiffness is advantageous, they have a feature that corrugated patterns are relatively easily actualized. It is preferable that $S_{CR}/S_{SM}$ of an accommodation chamber for accommodating such a support member 3 should be set to 1.6 or greater. In this case, when the cross-sectional area of the figure represented by the contour of the conduit as seen from the longitudinal direction is referred to as $S_{CT}$, $S_{CR}/S_{CT}$ may be set to be smaller than $S_{CR}/S_{SM}$.

In particular, in a conduit support device having an intermediate member 5 between a support member 3 and an accommodation member, it is preferable to have such a dimensional margin. In this case, as the cross-sectional area $S_{SM}$ of the contour figure of the support member, an area including the intermediate member 5 may be applied.

Even in the case of using a support member 3 with a large aspect ratio in which there is a concern that corrugated patterns will be actualized, or even in the case where the height becomes larger than that of the intermediate member, if the conduit support device 1 has a configuration as mentioned above, it is possible to alleviate occurrence of corrugated patterns which might become a bending habit in the accommodation member and achieve improvement of the reliability of the accommodation member.

Figure 19:
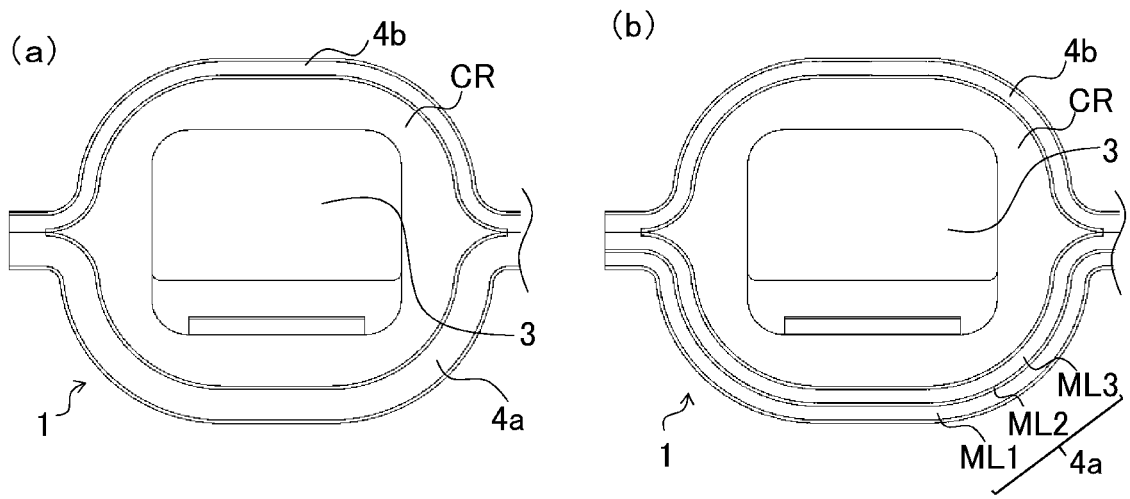
FIG. 19 shows another modification of the conduit support device 1 of the present invention.

(a) of FIG. 19 and (b) of FIG. 19 are views illustrating a still further example of the conduit support device 1, and are cross-sectional views of the conduit support device 1 as seen from the longitudinal direction thereof. The conduit support device 1 of the present embodiment can have the same configuration as those of the other conduit support devices 1 except that the configuration of the accommodation member is partially different. In the present embodiment, the accommodation member of the conduit support device 1 includes an inner sheet 4a to be positioned on the inner periphery side during bending, and an outer sheet 4b to be positioned on the outer periphery side during bending. Between the inner sheet 4a and the outer sheet 4b, an accommodation chamber CR is formed, and in the corresponding accommodation chamber CR, a support member 3 is inserted. Also in the present embodiment, between the support member 3 and the accommodation member, an intermediate member 5 does not need to be necessarily formed; however, it goes without saying that if an intermediate member 5 is formed, higher reliability is obtained.

In the present embodiment, the outer sheet 4b is made of a sheet having stretchability higher than that of the inner sheet 4a. Here, having high stretchability means that the amount of deformation in the longitudinal direction when external stress having the same magnitude is applied is large.

For example, an accommodation member made of such materials that when test pieces having the same shape and the same area are cut out of the outer sheet and the inner sheet, and tensile loads having the same magnitude are applied to the test pieces, at least in elastic deformation areas, the amount of deformation of the test piece cut out of the outer sheet is larger than the amount of deformation of the test piece cut out of the inner sheet corresponds to this.

In a conduit support device 1 having such a configuration, since it is possible to more greatly absorb the difference in periphery length between the inner periphery and the outer periphery attributable to bending by expansion of the outer sheet, it becomes possible to suppress corrugated patterns on the inner sheet positioned on the inner periphery side.

In (a) of FIG. 19, the outer sheet has a middle layer thinner than the inner sheet. In (b) of FIG. 19, the outer sheet is configured to have fewer layers than the inner sheet has. The middle layer of the inner sheet has a three-layer structure including ML1, ML2, and ML3, and ML2 is made of a material having mechanical strength higher than those of ML1 and ML3. The middle layer of the outer sheet and the middle layers ML1 and ML3 of the inner sheet are made of, for example, polyurethane, and the middle layer ML2 of the inner sheet is made of, for example, ePTFE.

In the configuration of (b) of FIG. 19, since the middle layer ML2 acts as a mechanical reinforcement layer, the bending elasticity of the inner sheet also increases. Since resistance to deformation attributable to external force increases, the inner sheet having high bending elasticity can obtain the effect of suppressing occurrence of corrugated patterns as compared to the case of having no mechanical reinforcement layer.

Figure 20:
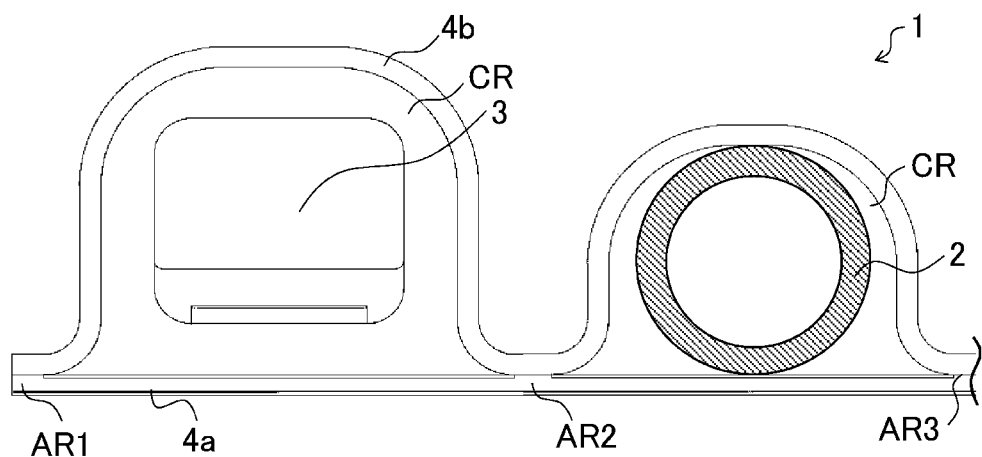
FIG. 20 shows another modification of the conduit support device 1 of the present invention.
Figure 21:
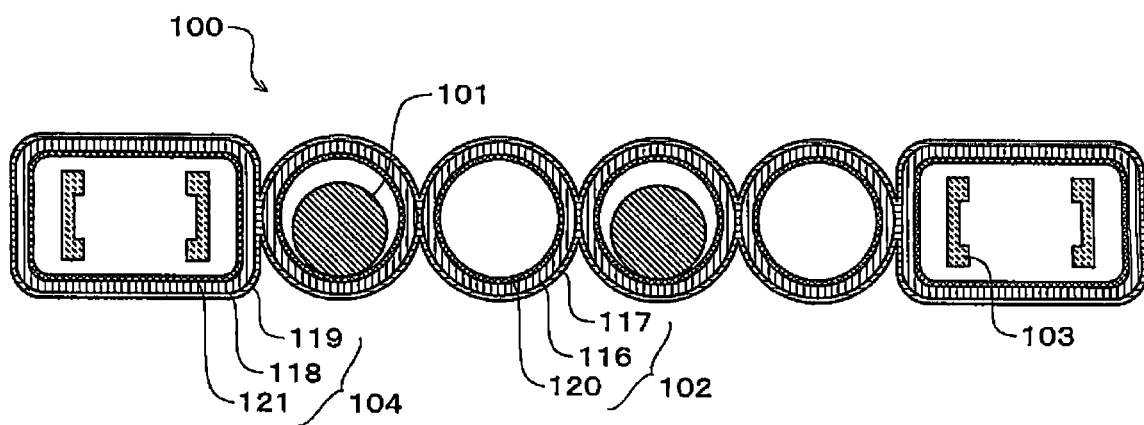
FIG. 21 is a cross-sectional view of a flat cable for wiring movable parts according to the prior art.

FIG. 20 is a view illustrating a still further example of the conduit support device 1, and is a cross-sectional view of the conduit support device 1 as seen from the longitudinal direction thereof. The conduit support device 1 of the present embodiment can have the same configuration as those of the other conduit support devices 1 except that the configuration of the accommodation member is partially different. In the present embodiment, the accommodation member of the conduit support device 1 includes an inner sheet 4a to be positioned on the inner periphery side during bending, and an outer sheet 4b to be positioned on the outer periphery side during bending. The inner sheet 4a and the outer sheet 4b are joined to each other in three joint areas including a joint area AR1, a joint area AR2, and a joint area AR3.

In the area between the joint area AR1 and the joint area AR2, an accommodation chamber CR is formed between the inner sheet 4a and the outer sheet 4b, and a support member 3 is inserted into the corresponding accommodation chamber CR. Also in the present embodiment, between the support member 3 and the accommodation member, an intermediate member 5 does not need to be necessarily formed; however, it goes without saying that if an intermediate member 5 is formed, higher reliability is obtained. In the area between the joint area AR2 and the joint area AR3, another accommodation chamber CR is formed between the inner sheet 4a and the outer sheet 4b, and a conduit 2 is inserted into the corresponding accommodation chamber CR.

In the present embodiment, in a cross-sectional view of the conduit support device 1 as seen from the longitudinal direction thereof, the length along the inner sheet 4a between the joint area AR1 and the joint area AR2 is shorter than the length along the outer sheet 4b between the joint area AR1 and the joint area AR2. In a conduit support device 1 with an accommodation member having such a configuration, the shape of the inner sheet 4a is less uneven than the shape of the outer sheet 4b is. Therefore, during bending of the conduit support device 1, the inner sheet 4a can reduce occurrence of complicated creases attributable to overlapping of a plurality of curves, and as a result, it is possible to suppress acceleration of wear attributable to occurrence of corrugated patterns. Further, in FIG. 20, the inner sheet 4a is shown as a completely flat structure; however, it may bulge toward the inner periphery side (downward in the drawing). As seen from a plane including at least two adjacent joint areas AR1 and AR2, the amount of bulging of the inner sheet 4a toward the inner periphery side needs only to be smaller than the amount of bulging of the outer sheet 4b toward the outer periphery side.

EXAMPLES

Now, examples of the present invention will be described.

Creation of First Example and First Comparative Example

A support member 3 made of a metal element as shown in FIG. 5 to FIG. 7 was stored in an accommodation member 4 made from three layers, i.e. an inner layer IL (ePTFE), a middle layer ML (polyurethane), and an outer layer OL (ePTFE).

And, as a first example, a conduit support device 1 having an intermediate member 5 made of polyethylene resin (PE) and having a heat-shrinkable tube structure between the support member 3 and the accommodation member 4 was prepared. As a first comparative example for comparison, a conduit support device 1 in which there was no intermediate member 5, i.e. the surface of a support member 3 was in direct contact with an accommodation member 4 was prepared.

(Durability Test)

The first example and the first comparative example prepared were moved back and forth at a frequency of 105 cycles/minute in the state where the mounting height (corresponding to two times the curvature radius R of the curved part of the support member 3) was set to 100 mm and the amount of stroke of the moving end was set to 400 mm). After one million cycles, the conduit support devices 1 were stopped, and the inner surfaces of the accommodation members 4 were observed with an optical microscope.

(Test Results)

In the first comparative example, in an area of the inner surface of the accommodation member 4 in contact with the outer surface of the support member 3, clear stripe-shaped patterns in the direction parallel to the longitudinal direction of the support member 3 were confirmed. In some parts, patterns considered as flaws formed since the surface layer was scratched were confirmed. These are presumed to be flaws formed since relative moving of the support member 3 and the accommodation member 4 in the longitudinal direction of the support member 3 was repeated. These flaws are very shallow flaws, but may lead to problems such as breakage of the accommodation member 4, if reciprocating is further repeated, or depending on the weight of the conduit which the support member supports.

In contrast, in the first example, neither clear stripe-shaped patterns as seen in the first comparative example nor patterns considered as flaws formed since the surface layer was scratched were not confirmed.

In this way, it was possible to confirm the durability of the conduit support device 1 having the intermediate member 5 between the support member 3 and the accommodation member 4.

Creation of Second Comparative Example

As a second comparative example, the following conduit support device was prepared. In the second comparative example, there was no intermediate member. First, a support member 3 as shown in FIG. 11 was prepared. This support member 3 included block members made of glass-reinforced liquid crystal polymer, and the aspect ratio (height/width) of the support member was about 0.83.

This support member was stored in an accommodation member 4 having the structure shown in FIG. 16. In both of the inner sheet 4a and the outer sheet 4b of the accommodation member, the inner layers IL and outer layers OL were made of ePTFE, and the middle layers ML were made of polyurethane. The total thickness of the inner sheet and the outer sheet was 0.4 mm. The above-mentioned dimensional margin expressed as $S_{CR}/S_{SM}$ was set to about 1.3. The length between joint areas AR of the inner sheet defining an accommodation chamber was set to be the same as that of the outer sheet.

Creation of Second to Fifth Examples

As examples, the following conduit support devices were prepared. Each conduit support device has the same configuration as that of the comparative example except the described differences.

As a second example, a conduit support device in which a support member with a NITOFLON adhesive tape attached to the bottom surface was inserted was prepared. The thickness of this adhesive tape was 0.08 mm, and in a cross section as seen from the longitudinal direction of the support member, the tape formation height on the side surface of the support member was set to about 10% of the height of the support member.

As a third example, a conduit support device in which an identical support member was inserted in an accommodation member enlarged such that the above-mentioned dimensional margin expressed as $S_{CR}/S_{SM}$ became 1.6 was prepared.

As a fourth example, a conduit support device in which an identical support member was inserted in an accommodation member in which the thickness of the inner sheet was 0.8 mm was prepared. The thickness of the outer sheet of the accommodation member was about 50% of the thickness of the inner sheet.

As a fifth example, a device in which the length between joint areas defining an accommodation chamber for inserting a support member was shorter than the length along the outer sheet was prepared.

(Durability Test)

The comparative second example and the second to fifth examples prepared were moved back and forth at a frequency of 70 cycles/minute in the state where the mounting height (corresponding to two times the curvature radius R of the curved part of the support member 3) was set to 125 mm and the amount of stroke of the moving end was set to 400 mm. At intervals of a predetermined number of cycles, the conduit support devices 1 were stopped, and transmission patterns appearing on a smoother by installing a light source on the back of the smoother were observed to observe their wear states.

(Test Results)

In the second comparative example, at the 2 millionth cycle, shadows caused by wear were clearly confirmed; however, in the second, third, and fourth examples, even after about 2.68 to 3.15 million cycles, wear was rarely confirmed. Also, in the conduit support device of the fifth example, it was confirmed by visual inspection of the curved state that corrugated patterns on the inner periphery side of bending were alleviated. As mentioned above, in various embodiments, it was possible to verify that the reliability of each conduit support device actually improved.

Although the present invention has been described in detail with reference to its specific embodiments, it is obvious to those skilled in the art that various changes or modifications can be made on the invention without departing from its spirit and scope.

INDUSTRIAL APPLICABILITY

The conduit support device according to the present invention can be applied to, for example, robot travel devices and so on assembled in machining lines, semiconductor manufacturing equipment, flat panel display manufacturing equipment, electronic-component mounting apparatuses, and so on.

REFERENCE SIGNS LIST

1 CONDUIT SUPPORT DEVICE
2 CONDUIT
3 SUPPORT MEMBER
4 ACCOMMODATION MEMBER
5 INTERMEDIATE MEMBER

The invention claimed is:

1. A conduit support device comprising:
a conduit;
a support member configured to extend along a longitudinal direction of the conduit, and integrally support the conduit, and be capable of being bent at an arbitrary position in the longitudinal direction; and
an accommodation member having a plurality of accommodation chambers, each of which defines a cylindrical space extending along the longitudinal direction, wherein
the plurality of accommodation chambers comprises a first accommodation chamber in which the conduit is stored and a second accommodation chamber in which the support member is stored, and
the support member comprises a trapping layer capable of trapping particles existing inside the second accommodation chamber of the accommodation member.

2. The conduit support device according to claim 1, wherein
the support member is configured to be capable of being bent in a first direction up to a predetermined curvature and maintain a straight shape without being bent in a second direction which is a direction opposite to the first direction, and
a shape of the conduit and a shape of the accommodation member are restricted by a shape of the support member.

3. The conduit support device according to claim 1, wherein
the trapping layer is made of an adhesive substance.

4. The conduit support device according to claim 3, wherein
the adhesive substance is selected from a rubber-based adhesive, an acrylic adhesive, or a silicone-based adhesive.

5. The conduit support device according to claim 1, wherein
the trapping layer is made of a substance which is semisolid.

6. The conduit support device according to claim 5, wherein
the substance which is semisolid is formed as a layer having a thickness of 10 μm or greater.

7. The conduit support device according to claim 5, wherein
the substance which is semisolid is formed as a layer made of grease and having a thickness of 10 μm or greater.

8. The conduit support device according to claim 5, wherein
the substance which is semisolid comprises grease having a hardness so that worked penetration of the grease is equal to or lower than 400 at 25° C.

9. The conduit support device according to claim 5, wherein
the substance which is semisolid comprises grease having a hardness so that worked penetration of the grease is equal to or higher than 80 at 25° C.

10. The conduit support device according to claim 1, wherein
the particles existing inside the accommodation member comprise abrasion powder of the support member or the accommodation member, the abrasion powder being generated by sliding of the conduit support device.

11. The conduit support device according to claim 1, wherein
the support member comprises an area in which the trapping layer is provided and an area in which the trapping layer is not provided.

12. The conduit support device according to claim 1, wherein the support member is made from a plurality of block members and a surface of each of the plurality of block members comprises an area at which the trapping layer is provided and an area at which the trapping layer is not provided, and the area at which the trapping layer is provided is positioned in an area of the surface of each of the plurality of block members which does not contact with other of the plurality of block members.

13. The conduit support device according to claim 1, wherein the support member has an aspect ratio of 0.7 or greater, in which the aspect ratio is a value obtained by dividing a size of the support member in a direction from an inner periphery side of the bending of the support member to an outer periphery side of the bending of the support member in a cross-sectional view of the support member by a size of the support member in a direction being perpendicular to the direction from the inner periphery side of the bending of the support member to the outer periphery side of the bending of the support member in the cross-sectional view of the support member.

14. The conduit support device according to claim 1, wherein the accommodation member comprises an inner sheet which is positioned at an inner periphery side of the bending of the support member, and an outer sheet which is positioned at an outer periphery side of the bending of the support member, the accommodation member comprises a plurality of joint areas formed by bonding the inner sheet and the outer sheet, and the plurality of accommodation chambers is formed respectively between the plurality of joint areas.

15. The conduit support device according to claim 14, wherein the plurality of joint areas formed by bonding the inner sheet and the outer sheet comprises a first joint area, a second joint area and a third joint area, the first accommodation chamber in which the conduit is stored is defined by the first joint area and the second joint area, and the second accommodation chamber in which the support member is stored is defined by the second joint area and the third joint area, and in a state where the accommodation member is flattened, a length between the first joint area and the second joint area is smaller than a length between the second joint area and the third joint area.

16. The conduit support device according to claim 15, wherein the length between the second joint area and the third joint area is equal to or larger than 1.2 times the length between the first joint area and the second joint area.

17. The conduit support device according to claim 14, wherein the outer sheet has stretchability higher than stretchability of the inner sheet.

18. A processing apparatus comprising:

a stage on which a workpiece to be processed is to be disposed;

a processing head which is relatively movable with respect to the workpieces; and the conduit support device according to claim 1.

* * * * *